(12) United States Patent
Hudak et al.

(10) Patent No.: US 10,991,935 B2
(45) Date of Patent: Apr. 27, 2021

(54) STRUCTURAL LITHIUM-ION BATTERIES WITH CARBON FIBER ELECTRODES

(71) Applicant: The MITRE Corporation, McLean, VA (US)

(72) Inventors: Nicholas Hudak, Washington, DC (US); Kurt Eisenbeiser, Vienna, VA (US)

(73) Assignee: The MITRE Corporation, McLean, VA (US)

( * ) Notice: Subject to any disclaimer, the term of this patent is extended or adjusted under 35 U.S.C. 154(b) by 54 days.

(21) Appl. No.: 15/937,279

(22) Filed: Mar. 27, 2018

(65) Prior Publication Data

US 2019/0305292 A1  Oct. 3, 2019

(51) Int. Cl.
| | | |
|---|---|---|
| *H01M 4/133* | (2010.01) | |
| *H01M 4/04* | (2006.01) | |
| *H01M 10/0525* | (2010.01) | |
| *H01M 4/1393* | (2010.01) | |
| *H01M 4/02* | (2006.01) | |

(52) U.S. Cl.
CPC ......... *H01M 4/133* (2013.01); *H01M 4/0433* (2013.01); *H01M 4/1393* (2013.01); *H01M 10/0525* (2013.01); *H01M 2004/025* (2013.01); *H01M 2220/20* (2013.01)

(58) Field of Classification Search
CPC ............... H01M 4/133; H01M 4/1393; H01M 10/0525; H01M 4/0433; H01M 2004/025; H01M 2220/20
USPC ....................................................... 429/178
See application file for complete search history.

(56) References Cited

U.S. PATENT DOCUMENTS

| | | |
|---|---|---|
| 6,872,330 B2 | 3/2005 | MacK et al. |
| 7,553,341 B2 | 6/2009 | Pan et al. |
| 7,855,017 B1 * | 12/2010 | Snyder .............. H01M 10/0565 429/232 |
| 8,343,572 B2 | 1/2013 | Varade et al. |
| 8,520,365 B2 | 8/2013 | Gruner et al. |
| 8,659,874 B2 | 2/2014 | Shaffer et al. |
| 8,665,581 B2 | 3/2014 | Fleischer et al. |

(Continued)

FOREIGN PATENT DOCUMENTS

| | | |
|---|---|---|
| WO | 2013/136034 A1 | 9/2013 |
| WO | WO 2016/122196 | 8/2016 |
| WO | WO 2016/127122 | 11/2016 |

OTHER PUBLICATIONS

Multifunctional structural energy storage composite supercapacitors Natasha Shirshova,a Hui Qian,a Matthieu Houll'e,b Joachim H. G. Steinke,a Anthony R. J. Kucernak,a (Year: 2014).*
Asp, L. E. (2012) "Structural Battery Materials," ECCM15—15th European Conference on Composite Materials, Venice, Italy; 7 pages.

(Continued)

*Primary Examiner* — Gary D Harris
(74) *Attorney, Agent, or Firm* — Morrison & Foerster LLP

(57) ABSTRACT

Described are structural electrode and structural batteries having high energy storage and high strength characteristics and methods of making the structural electrodes and structural batteries. The structural batteries provided can include a liquid electrolyte and carbon fiber-reinforced polymer electrodes comprising metallic tabs. The structural electrodes and structural batteries provided can be molded into a shape of a function component of a device such as ground vehicle or an aerial vehicle.

20 Claims, 17 Drawing Sheets

(56) References Cited

U.S. PATENT DOCUMENTS

| | | |
|---|---|---|
| 8,778,800 B1 | 7/2014 | Chang et al. |
| 8,787,001 B2 | 7/2014 | Fleischer et al. |
| 8,951,306 B2 | 2/2015 | Yu et al. |
| 9,017,854 B2 | 4/2015 | Fleischer |
| 9,190,217 B2 | 11/2015 | Snyder et al. |
| 9,236,197 B2 | 1/2016 | Dai et al. |
| 2011/0051316 A1 | 3/2011 | Liu et al. |
| 2011/0304964 A1 | 12/2011 | Fleischer et al. |
| 2013/0034803 A1 | 2/2013 | Adzic et al. |
| 2013/0130049 A1 | 5/2013 | Moilanen et al. |
| 2013/0202945 A1 | 8/2013 | Zhamu et al. |
| 2013/0302697 A1 | 11/2013 | Wang et al. |
| 2013/0335884 A1 | 12/2013 | Gubin et al. |
| 2014/0030590 A1 | 1/2014 | Wang et al. |
| 2014/0326600 A1 | 11/2014 | Li et al. |
| 2014/0330100 A1 | 11/2014 | Li et al. |
| 2015/0009605 A1 | 1/2015 | Dumas et al. |
| 2015/0085423 A1* | 3/2015 | Ciocanel ............... H01G 11/34 361/502 |
| 2015/0093629 A1 | 4/2015 | Sayre et al. |
| 2015/0162140 A1 | 6/2015 | Hucker et al. |
| 2015/0249362 A1 | 9/2015 | Bridgelall et al. |
| 2015/0287543 A1 | 10/2015 | Aksay et al. |
| 2015/0340169 A1 | 11/2015 | Qiu et al. |
| 2016/0083872 A1 | 3/2016 | Zhang et al. |
| 2016/0293954 A1 | 10/2016 | Zhamu et al. |
| 2017/0050533 A1 | 2/2017 | Wei et al. |
| 2017/0077518 A1 | 3/2017 | Nishide et al. |
| 2017/0114162 A1 | 4/2017 | Haeupler et al. |
| 2018/0075982 A1 | 3/2018 | Hudak et al. |
| 2019/0103235 A1 | 4/2019 | Hudak et al. |

OTHER PUBLICATIONS

Ekstedt, S. et al. (2010) "Structural batteries made from fibre reinforced composites," Plastics, Rubber and Composites, vol. 39, No. 3/4/5; 3 pages.

Kjell, Maria Hellqvist (2013) "Performance of Conventional and Structural Lithium-Ion Batteries," Doctoral Thesis, KTH Chemical Science and Engineering, TRITA-CHE Report 2013:28, ISSN 1654-1081, ISBN 978-91-7501-774-7; 58 pages.

Benson, Jim et al. "Multifunctional CNT-Polymer Composites for Ultra-Tough Structural Super capacitors and Desalination Devices," Advanced Materials 25,45 (2013); pp. 6625-6632.

Hudak et al., Office Action dated Feb. 22, 2018, directed to U.S. Appl. No. 15/263,538; 8 pages.

Kim, Yong Jung et al. "Chemically Modified Multiwalled Carbon Nanotubes as an Additive for Supercapacitors," Small 2(3): pp. 339-45, Mar. 2006.

Qin, Zongyi et al. "Polyaniline/multi-walled carbon nanotuhe composites with core-shell structures as supercapacitor electrode materials," Electrochimica Acta 55, Apr. 2010, pp. 3904-3908.

Shirshova, N. et al. "Multifunctional structural energy storage composite supercapacitors," Faraday discussions 172 (2014) pp. 81-103.

Singh, Pramod Kumar et al. " Ionic liquid-solid polymer electrolyte blends for supercapacitor applications," Polymer Bulletin, Aug. 13, 2015; pp. 255-263.

Wang, Hualan et al. "A nanostructured graphene/polyaniline hybrid material for super capacitors, Nanoscale 2:2164," Nanoscale, 2010, 2, pp. 2164-2170.

Wang, K., et al. "High-Performance Two-Ply Yarn Supercapacitors Based on Carbon Nanotubes and Polyaniline Nanowire Arrays," Advanced Materials 25.10 (2013); pp. 1494-1498.

* cited by examiner

STRUCTURAL LITHIUM-ION BATTERIES WITH CARBON FIBER ELECTRODES

FIELD OF THE INVENTION

This disclosure relates to structural batteries having high energy storage and high strength characteristics. More particularly, this disclosure relates to structural lithium-ion batteries having carbon fiber-reinforced polymer electrodes, metallic tabs electrically and physically embedded in the carbon fiber-reinforced polymer, and/or a liquid electrolyte.

BACKGROUND OF THE INVENTION

Common types of energy storage devices include batteries and capacitors. Batteries use chemical reactions to store energy and traditional capacitors use the physical separation of electrical charges to store energy. Typically, a battery takes up considerable volume in a device. Accordingly, large volume batteries result in less available space for structural components in devices that use conventional batteries.

The structure of a conventional lithium-ion battery includes an electrolyte sandwiched between a positive and a negative electrode. The electrolyte allows for lithium ion migration between the two electrodes of the battery. Although lithium-ion batteries containing a liquid electrolyte may have acceptable energy storage properties, they lack sufficient strength characteristics.

Further, battery-powered micro-unmanned aerial vehicles (UAVs) are increasing in popularity due to their portability, low cost, and unobtrusiveness. However, micro-UAVs are greatly limited in their mission endurance, particularly when equipped with high-powered sensor payloads. A larger conventional battery is able to store more energy and increase endurance in such vehicles. However, to achieve the necessary energy storage capacity for such vehicles, a conventional battery must be significantly larger and heavier than desirable.

SUMMARY OF THE INVENTION

Described are structural electrodes and structural batteries that can provide both energy to a device and structural support to a device by being formed into a functional component or a portion of a functional component of a device. For example, a structural battery according to embodiments described herein may be molded, shaped, or otherwise fabricated into the shape of a wing, fuselage, boom, body, door, chassis, or other structural/functional component of a device. Structural batteries described may also reduce the overall weight of a device and improve battery life and power.

Structural electrodes and structural batteries described herein may be particularly useful in applications including, but not limited to, communication satellites, spacecraft, ground vehicles, and/or unmanned aerial vehicles (UAV). By incorporating a structural battery into a wing component or fuselage component of a UAV, or a door component or chassis component of a ground vehicle, for example, endurance (range and/or flight time) may increase due to the interdependence of the subsystem weights, amount of available energy, and endurance or range. Further, structural electrodes and structural batteries may be incorporated, embedded, shaped, molded, placed inside a cavity or chamber, conformed to, or comprise a functional component of such applications. Accordingly, structural electrodes and structural batteries described herein may improve the size, weight, and power of a device. In some embodiments, structural electrodes and structural batteries described herein may improve the aerodynamics of a device.

Unlike conventional batteries, which are used for energy storage, structural batteries are used for providing energy and structural support to a device. Currently, most energy storage devices require an additional, separate structural component to provide necessary strength characteristics. Accordingly, these combined systems (i.e., energy device plus a separate structural component) can have a large volume and/or mass.

However, Applicants have discovered an integrated energy and structural system that uses the same material composite for both energy storage and structural support. Applicant's integrated system can have a smaller volume and/or mass compared to a conventional energy storage device combined with a separate structural component.

Applicants have developed a structural battery that combines both energy storage and structural integrity into a single functional material/unit. Specifically, Applicants have developed a structural electrode that, when combined with a liquid lithium-ion electrolyte, can increase both energy storage and strength characteristics. Accordingly, structural electrodes, structural batteries, and methods of making these structural electrodes and structural batteries that exhibit increased energy storage and strength characteristics relative to the state-of-the-art energy storage devices are provided herein.

In some embodiments, structural batteries and structural electrodes and methods of making structural batteries and structural electrodes include a carbon fiber-reinforced polymer with both high energy storage and high structural integrity characteristics. Metallic tabs may be electrically and physically connected to the carbon fiber-reinforced polymer by embedding the metallic tabs between layers of carbon fiber sheets during fabrication. One or more electrodes may include carbon fiber-reinforced polymer. Some embodiments of a structural battery may include a liquid electrolyte.

In some embodiments, all structural support of the functional component is provided by the structural electrode and/or structural battery, and no additional structural component is needed. In some embodiments, a portion of the structural support of the functional component is provided by the structural electrode and/or structural battery, and some additional structural component(s) may be needed.

In some embodiments, a method of making an electrode for a structural battery is provided, the method comprising: positioning one or more metallic tabs between two or more layers of carbon fiber sheets such that a first portion of the one or more metallic tabs is embedded between the carbon fiber sheets and a second portion of the one or more metallic tabs extends outwardly from the carbon fiber sheets; infiltrating the carbon fiber sheets with a polymer to form a carbon fiber-reinforced polymer; molding the carbon fiber-reinforced polymer into a shape of a functional component of a device; and abrading an edge of the carbon fiber-reinforced polymer to expose a portion of the carbon fiber.

In some embodiments of the method of making an electrode for a structural battery, at least a portion of the shape of the functional component comprises an exterior surface of the device.

In some embodiments of the method of making an electrode for a structural battery, the exterior surface of the device is functional.

In some embodiments of the method of making an electrode for a structural battery, the exterior surface is configured to increase the aerodynamic performance of the device.

In some embodiments of the method of making an electrode for a structural battery, the device is a ground vehicle or an aerial vehicle.

In some embodiments of the method of making an electrode for a structural battery, the functional component comprises one or more of a component of: a wing, a boom, a body, a chassis, or a door of a device.

In some embodiments of the method of making an electrode for a structural battery, the method further comprises coating one or more surfaces of the carbon fiber-reinforced polymer with an active material.

In some embodiments of the method of making an electrode for a structural battery, the active material comprises one or more of graphite, silicon, mesoporous carbon microbeads, lithium titanate, lithium cobalt oxide, lithium nickel-manganese-cobalt oxide, or lithium iron phosphate.

In some embodiments of the method of making an electrode for a structural battery, the one or more metallic tabs comprises aluminum, copper, or nickel.

In some embodiments of the method of making an electrode for a structural battery, abrading an edge of the carbon fiber-reinforced polymer comprises physical abrasion or chemical exposure.

In some embodiments of the method of making an electrode for a structural battery, infiltrating the carbon fiber sheets with a polymer comprises: depositing a liquid acrylate monomer on the carbon fiber sheets; and polymerizing the liquid acrylate monomer with an initiator.

In some embodiments of the method of making an electrode for a structural battery, the liquid acrylate monomer comprises ethoxylated (4) pentaerythritol tetraacrylate, tetraethylene glycol dimethacrylate, ethoxylated (30) bisphenol-A diacrylate, propoxylated (3) glyceryl triacrylate, methoxy polyethylene glycol (500) monoacrylate, or any combination thereof.

In some embodiments of the method of making an electrode for a structural battery, the initiator is tert-butyl peroxide.

In some embodiments of the method of making an electrode for a structural battery, the initiator comprises more than 0.1 wt % of an initiator-liquid monomer mixture.

In some embodiments of the method of making an electrode for a structural battery, the initiator comprises less than 5 wt % of an initiator-liquid monomer mixture.

In some embodiments of the method of making an electrode for a structural battery, infiltrating the carbon fiber sheets with a polymer comprises: depositing a mixture comprising a resin and a hardener on the carbon fiber sheets; and curing the mixture.

In some embodiments, an electrode for a structural battery is provided, the electrode comprising: one or more carbon fiber sheets; one or more metallic tabs embedded between layers of the one or more carbon fiber sheets; and a polymer, wherein the electrode is molded into a shape of a functional component of a device.

In some embodiments of the electrode, at least a portion of the shape of the functional component comprises an exterior surface of the device.

In some embodiments of the electrode, the exterior surface of the device is functional.

In some embodiments of the electrode, the exterior surface is configured to increase the aerodynamic performance of the device.

In some embodiments of the electrode, the device is a ground vehicle or an aerial vehicle.

In some embodiments of the electrode, the functional component comprises one or more of a component of: a wing, a boom, a body, a chassis, or a door of a device.

In some embodiments of the electrode, the one or more metallic tabs embedded between layers of the carbon fiber sheets comprise a first portion embedded between the one or more carbon fiber sheets and a second portion extending outwardly from the one or more carbon fiber sheets.

In some embodiments of the electrode, the electrode further comprises a surface coating comprising an active material.

In some embodiments of the electrode, the active material comprises one or more of graphite, silicon, mesoporous carbon microbeads, lithium titanate, lithium cobalt oxide, lithium nickel-manganese-cobalt oxide, or lithium iron phosphate.

In some embodiments of the electrode, the one or more metallic tabs comprises aluminum, copper, or nickel.

The electrode of claim 17, wherein an edge is abraded using physical abrasion or chemical abrasion to expose a portion of the carbon fiber of the electrode.

In some embodiments of the electrode, the polymer comprises a liquid acrylate monomer and an initiator.

In some embodiments of the electrode, the initiator comprises tert-butyl peroxide.

In some embodiments of the electrode, the liquid acrylate monomer comprises ethoxylated (4) pentaerythritol tetraacrylate, tetraethylene glycol dimethacrylate, ethoxylated (30) bisphenol-A diacrylate, propoxylated (3) glyceryl triacrylate, methoxy polyethylene glycol (500) monoacrylate, or any combination thereof.

In some embodiments of the electrode, the initiator comprises more than 0.1 wt % of an initiator-liquid monomer mixture.

In some embodiments of the electrode, the initiator comprises less than 5 wt % of an initiator-liquid monomer mixture.

In some embodiments of the electrode, the polymer comprises a resin and a hardener.

In some embodiments, a structural battery for a device is provided, the structural battery comprising: one or more carbon fiber-reinforced polymer electrodes comprising: two or more carbon fiber sheets; one or more metallic tabs; and a polymer; and a liquid electrolyte, wherein the structural battery is molded into a shape of a functional component of a device.

In some embodiments of the structural battery, at least a portion of the shape of the functional component comprises an exterior surface of the device.

In some embodiments of the structural battery, the exterior surface of the device is functional.

In some embodiments of the structural battery, the exterior surface is configured to increase the aerodynamic performance of the device.

In some embodiments of the structural battery, the device is a ground vehicle or an aerial vehicle.

In some embodiments of the structural battery, the functional component comprises one or more of a component of: a wing, a boom, a body, a chassis, or a door of a device.

In some embodiments of the structural battery, the structural battery further comprises a surface coating on one or more surfaces of the one or more carbon fiber-reinforced polymer electrodes.

In some embodiments of the structural battery, the surface coating comprises an active material comprising one or more of graphite, silicon, mesoporous carbon microbeads, lithium titanate, lithium cobalt oxide, lithium nickel-manganese-cobalt oxide, or lithium iron phosphate.

In some embodiments of the structural battery, the structural battery further comprises one or more separators between two or more electrodes of the structural battery.

In some embodiments of the structural battery, the structural battery is a single-sided battery comprising layers in the order of a carbon fiber-reinforced anode, a separator, and a cathode coating on a layer of aluminum.

In some embodiments of the structural battery, the structural battery is a double-sided battery comprising layers in the order of a carbon fiber-reinforced anode, a separator, a double-sided cathode coating, a separator, and a carbon fiber-reinforced anode.

In some embodiments of the structural battery, the liquid electrolyte comprises one or more of lithium hexafluorophosphate, lithium tetrafluoroborate, lithium perchlorate, lithium bis(trifluoromethyl sulfonyl)imide, lithium trifluoromethanesulfonate, ethylene carbonate, ethyl methyl carbonate, propylene carbonate, dimethyl carbonate, or diethyl carbonate.

In some embodiments of the structural battery, the one or more metallic tabs comprise aluminum, copper, or nickel.

In some embodiments of the structural battery, an edge of the one or more carbon fiber-reinforced polymer electrodes is abraded using physical abrasion or chemical abrasion to expose a portion of the carbon fiber of the electrode.

In some embodiments of the structural battery, the polymer comprises a liquid acrylate monomer and an initiator.

In some embodiments of the structural battery, the liquid acrylate monomer comprises ethoxylated (4) pentaerythritol tetraacrylate, tetraethylene glycol dimethacrylate, ethoxylated (30) bisphenol-A diacrylate, propoxylated (3) glyceryl triacrylate, methoxy polyethylene glycol (500) monoacrylate, or any combination thereof.

In some embodiments of the structural battery, the initiator is tert-butyl peroxide.

In some embodiments of the structural battery, the initiator comprises more than 0.1 wt % of an initiator-liquid monomer mixture.

In some embodiments of the structural battery, the initiator comprises less than 5 wt % of an initiator-liquid monomer mixture.

In some embodiments of the structural battery, the polymer comprises a resin and a hardener.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Additional advantages will be readily apparent to those skilled in the art from the following detailed description. The examples and descriptions herein are to be regarded as illustrative in nature and not restrictive.

BRIEF DESCRIPTION OF THE DRAWINGS

Exemplary embodiments are described with reference to the accompanying figures, in which.

DETAILED DESCRIPTION OF THE INVENTION

Figure 1:
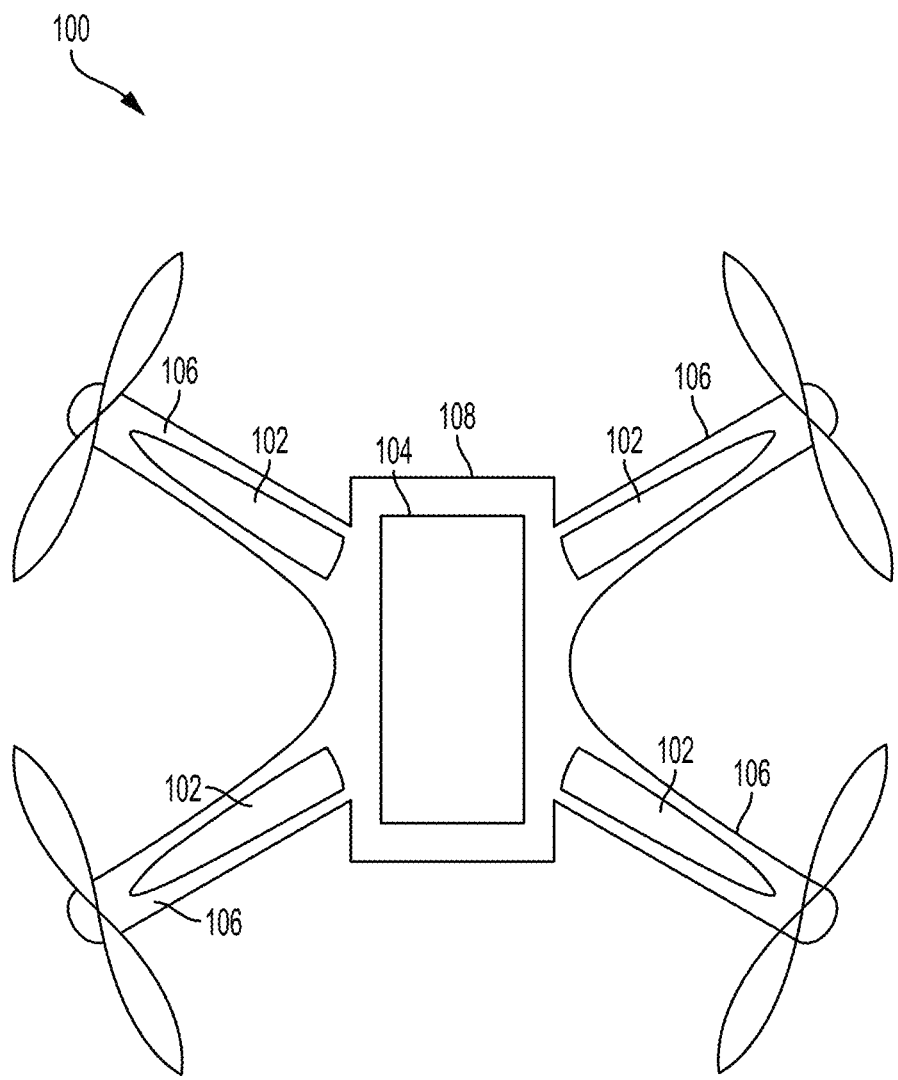
FIG. 1 shows a structural battery in the shape of a functional component according to some embodiments.

Structural electrodes and structural batteries described may be applied to devices including, but not limited to, communication satellites, spacecraft, ground vehicles, and/or unmanned aerial vehicles (UAV). For example, a structural battery and/or structural electrode may be incorporated into functional components of a device such as a wing component or fuselage component of a UAV, or a door component or chassis component of a ground vehicle. By incorporating structural electrodes and/or structural batteries into functional components of a device, the endurance of the device (range and/or flight time) may increase due to the interdependence of the subsystem weights, amount of available energy, flight endurance, and/or range of vehicle. In some embodiments, structural electrodes and/or structural batteries may improve the aerodynamic performance of a device.

Further, structural electrodes and structural batteries may be incorporated into such applications to improve the size, weight, and power of the device. Structural electrodes and structural batteries according to embodiments described herein may be incorporated, embedded, molded, and/or placed into a cavity or chamber of a functional component. In some embodiments, a functional component may be formed around a structural electrode or battery. In some embodiments, a structural electrode or structural battery described herein may comprise a complete functional component of a device.

In some embodiments, all structural support of the functional component is provided by the structural electrode and/or structural battery, and no additional structural component is needed. In some embodiments, a portion of the structural support of the functional component is provided by the structural electrode and/or structural battery, and some additional structural component(s) may be needed.

Unlike traditional batteries, which are only used for providing energy, Applicants have discovered an integrated energy and structural system that uses the same material composite for both energy storage and structural support. Specifically, Applicants have developed structural batteries and structural electrodes and methods for making structural batteries and structural electrodes that can include multifunctional materials that provide energy storage as well as structural integrity. For example, some embodiments may include carbon fiber-reinforced polymer to provide both energy storage capabilities and structural integrity to a structural battery. Such an integrated system can have a smaller volume and/or mass when compared to a combination of corresponding mono-functional elements. Additionally, not only can the structural electrodes and structural batteries described herein have high structural integrity, but they can also have high energy storage capacity.

Described herein are examples of structural batteries and electrodes and methods for making structural electrodes and structural batteries. The carbon fiber-reinforced polymer may be used for electrical conductivity and structural integrity. One or more metallic tabs may be embedded between layers of the carbon fiber-reinforced polymer such that the one or more metallic tabs are physically and electrically in contact with a carbon fiber of the carbon fiber-reinforced polymer. One or more sides of a carbon fiber-reinforced polymer may be abraded to expose a portion of the carbon fiber. The carbon fiber-reinforced polymer may be oriented such that an abraded edge is within the structural battery, allowing the exposed carbon fiber to interact with an electrolyte of the structural battery. The result of this structure is an electrode and/or battery that can be shaped into a functional, structural component of a device.

As described in more detail below, Applicants have developed structural electrodes and structural batteries and methods of making structural electrodes and structural batteries using components that yield acceptable energy storage and structural properties.

Various embodiments of structural electrodes and structural batteries are described below in detail with reference to the figures included herein.

FIG. 1 provides a schematic of drone 100 with structural energy storage components according to embodiments described herein. For example, structural energy storage component 102 and 104 may comprise any one or more features of structural electrodes and/or structural batteries according to embodiments described herein. Structural energy storage component 102 and/or 104 may be a specific functional component of a device, or structural energy storage component 102 and/or 104 may be shaped, molded, conformed, embedded, placed inside a cavity or chamber, or otherwise integrated into a functional component of a device. In some embodiments, a functional component of a device may be formed around structural energy storage component 102 and/or 104.

Structural energy storage component 102 may be molded or shaped into a specific shape of a functional component of drone 100. Specifically, structural energy storage component 102 may be molded or shaped into the shape of boom 106. In some embodiments, structural energy storage 102 may be conformed, embedded, or placed inside of a cavity or chamber within boom 106. In some embodiments, boom 106 may be formed around structural energy storage 102.

Similarly, structural energy storage 104 may be molded or shaped into a body 108 of drone 100. In some embodiments, structural energy storage 104 may be conformed, embedded, or placed inside of a cavity or chamber within body 108. In some embodiments, body 108 may be formed around structural energy storage 104.

Figure 2A:
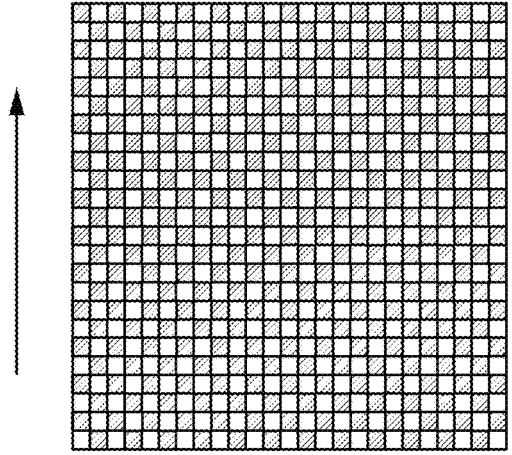
FIGS. 2A-B depict cut carbon fiber sheets according to some embodiments.
Figure 2B:
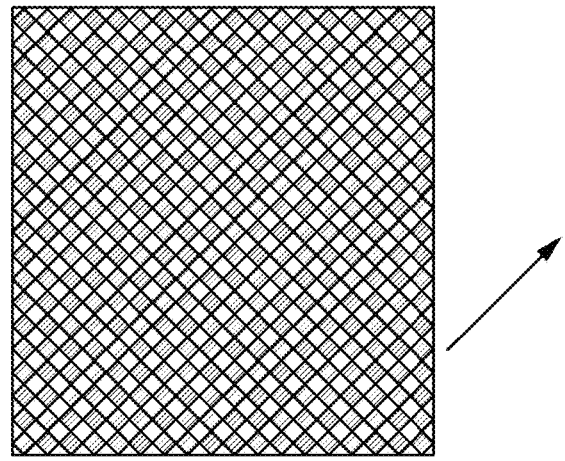

FIGS. 2A-B provide various orientations of carbon fiber sheets according to some embodiments described herein. Specifically, FIG. 2A depicts a carbon fiber sheet having a 0° orientation. In a rectangular carbon fiber sheet having a 0° orientation, a portion of the carbon fibers run parallel to two sides and perpendicular to two sides of the rectangular sheet. In FIG. 2A, an arrow indicates the direction of a portion of carbon fibers. Accordingly, in FIG. 2A, a portion of the carbon fibers run parallel to the left and right sides of the sheet and perpendicular to the top and bottom sides of the sheet.

Conversely, FIG. 2B depicts a carbon fiber sheet having a 45° orientation. In a rectangular carbon fiber sheet having a 45° orientation, the carbon fibers run at a 45° angle to at least a first side of the carbon fiber sheet and at a 225° angle to at least a second, parallel side of the carbon fiber sheet. In FIG. 2B, the arrow indicates the direction of the carbon fibers. Accordingly, in FIG. 2B, the carbon fibers run at a 45° angle to a bottom side of the carbon fiber sheet and a 225° angle to a top side of the carbon fiber sheet. Some embodiments may include carbon fiber sheets of other orientations as well. For example, some embodiments may use carbon fiber sheets of rectangular, circular, triangular, or other geometric shapes. The initial 2D shape of the components can be trivial and may be limited by the ability to maintain the fiber weave of the carbon fiber sheets. In some embodiments, the carbon fiber sheets can be oriented with the fibers parallel to the edge of the sheet. In other embodiments, the carbon fiber sheets can be oriented with the fibers at a 45° angle to the edge of the sheet. Some embodiments layer the carbon fiber sheets in alternating stacks.

Figure 3A:
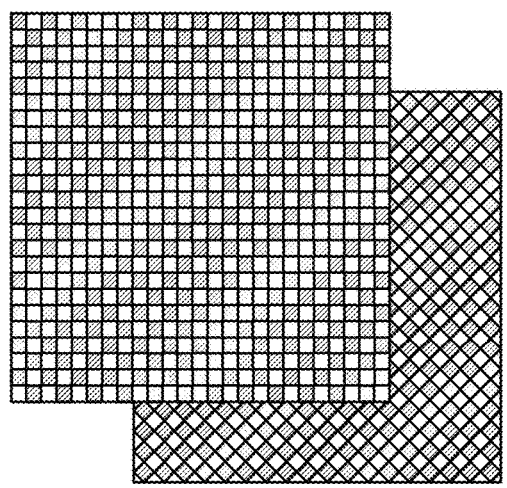
FIGS. 3A-C depict stacked carbon fiber sheets according to some embodiments.
Figure 3B:
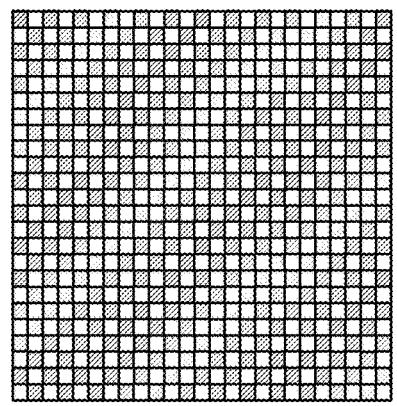
Figure 3C:
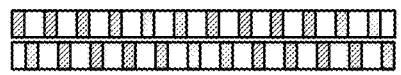

FIGS. 3A-C show a 0° oriented carbon fiber sheet and a 45° oriented carbon fiber sheet according to some embodiments. FIG. 3A illustrates a 0° oriented carbon fiber sheet being stacked and aligned on top of a 45° oriented carbon fiber sheet. Some embodiments may have the 45° oriented carbon fiber sheet stacked on top of the 0° oriented carbon fiber sheet. In some embodiments, more than two carbon fiber sheets may be used, wherein the stacking configuration alternates between 0° oriented and 45° oriented carbon fiber sheets. In some embodiments, a carbon fiber sheet stack may comprise only 0° orientated carbon fiber sheets or only 45° oriented carbon fiber sheets. In some embodiments, a carbon fiber sheet stack may include 0° oriented and/or 45° oriented carbon fiber sheets stacked with other oriented carbon fiber sheets as well.

FIGS. 3B and 3C provide a top view and a side view of the 0° oriented carbon fiber sheet stacked and aligned on top of the 45° oriented carbon fiber sheet according to some embodiments. FIG. 3B shows a top view with the 0° oriented carbon fiber sheet on top. Accordingly, if the stacked and aligned carbon fiber sheets are the same size and perfectly aligned on top of each other, only the top sheet (in this case, the 0° oriented carbon fiber sheet) is observable from a top perspective. However, if the sheets are not perfectly aligned, or a bottom sheet is larger than the topmost sheet, portions of bottom sheets may be observable in this view.

FIG. 3C provides a side view of a 0° oriented carbon fiber sheet stacked on top of a 45° carbon fiber sheet. In some embodiments, a 45° oriented carbon fiber sheet may be stacked on top of a 0° oriented carbon fiber sheet.

Figure 4A:
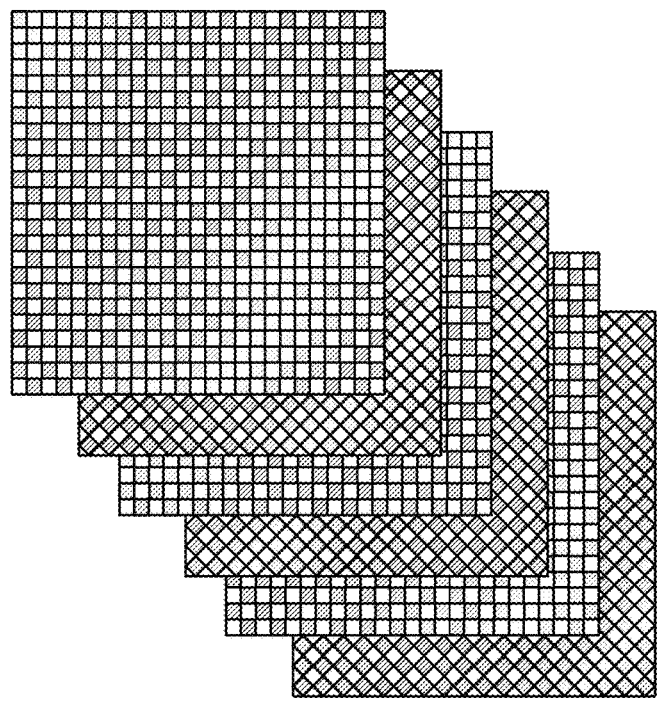
FIGS. 4A-C depict stacked carbon fiber sheets according to some embodiments.

FIG. 4A shows stacking of alternating carbon fiber sheets according to some embodiments. Specifically, FIG. 4A shows stacking of 6 carbon fiber sheets alternating between 0° oriented carbon fiber sheets and 45° oriented carbon fiber sheets. However, structural electrodes according to the embodiments herein may include any number of carbon fiber sheets in any of various stacking configurations.

Determining a number of carbon fiber sheets used to fabricate the carbon fiber-reinforced polymer presents a trade-off between the energy storage capacity and the structural integrity of the final product. For example, more carbon fiber sheets may increase the structural integrity of the electrode, but detract from the amount of energy stored per unit weight (or volume) of the electrode. Conversely, less carbon fiber sheets may increase the energy storage capabilities of the electrode, yet decrease the structural integrity of the electrode.

In some embodiments, more than one carbon fiber sheet may be used, more than two sheets may be used, more than three sheets may be used, or more than four sheets may be used. In some embodiments, less than ten carbon fiber sheets may be used, less than eight sheets may be used, less than six sheets may be used, or less than four sheets may be used. In some embodiments, two pieces of carbon fiber sheets may be used.

Additionally, as described above, any stacking configuration of carbon fiber sheets may be used, including but not limited to, only 0° oriented sheets, only 45° oriented sheets, alternating 0° and 45° oriented sheets, a mixed configuration of 0° oriented sheets and 45° oriented sheets such as A-B-B-A-B-B, A-B-A-C-A-B-A-C, A-A-B-B-A-A-B-B, etc., and any other combination of orientations recognized by one having skill in the art.

Figure 4B:
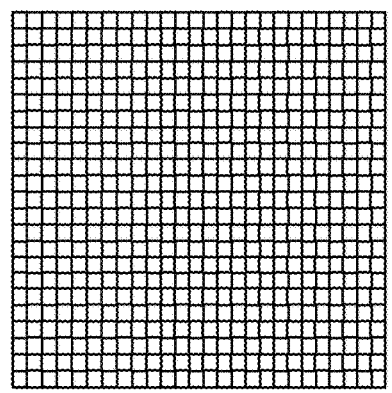

FIG. 4B shows a top view of the stacked configuration of carbon fiber sheets depicted in FIG. 4A. Similarly to FIG. 3B, and described in more detail above, the top view may vary according to the size and stacking configuration of the carbon fiber sheets.

Figure 4C:
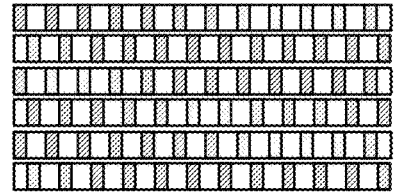

FIG. 4C provides a side view of the stacked configuration of carbon fiber sheets depicted in FIG. 4A. The stacking configuration of the carbon fiber sheets may be alternating, as shown in FIG. 4B, or the carbon fiber sheets may be stacked according to another pattern (i.e., A-B-B-A-B-B, A-B-A-C-A-B-A-C, A-A-B-B-A-A-B-B, etc.).

In some embodiments, one or more metallic tabs may be placed between layers of carbon fiber sheets. For example, FIG. 5 shows metallic tab 550 placed between two carbon fiber sheets. Metallic tab 550 may include two portions—an embedded portion 560 and an outwardly extending portion 558. Embedded portion 560 of metallic tab 550 may be located between two or more carbon fiber sheets. In FIG. 5B, embedded portion 560 of metallic tab 550 is shown located between two carbon fiber sheets. In some embodiments, embedded portion may be no less than 1 cm in length, or a length of at least 1 cm of metallic tab 550 may extend inwardly between two or more carbon fiber sheets. In some embodiments, embedded portion 560 may be greater than 1 cm long. In some embodiments, embedded portion 560 may be greater than 1.2 cm, greater than 1.4 cm, greater than 1.6 cm, greater than 1.8 cm, greater than 2.0 cm, greater than 2.5 cm, greater than 3.0 cm, greater than 5.0 cm, or greater than 10.0 cm long. In some embodiments, embedded portion 560 may be less than 10.0 cm, less than 8.0 cm, less than 5.0 cm, less than 3.0 cm, less than 2.5 cm, less than 2.0 cm, or less than 1.5 cm long.

In some embodiments, adhesive Kapton tape 552 may be applied to both sides of outwardly extending portion 558 of metallic tab 550 to prevent epoxy/polymer form adhering to metallic tab 550. However, Kapton tape 552 is only one method of preventing epoxy/polymer from adhering to metallic tab 550. In some embodiments, other types of physical mechanism may be used to prevent the epoxy from adhering to metallic tab 550. In some embodiments, chemical exposure may be used to remove any epoxy that adheres to metallic tab 550.

Figure 5A:
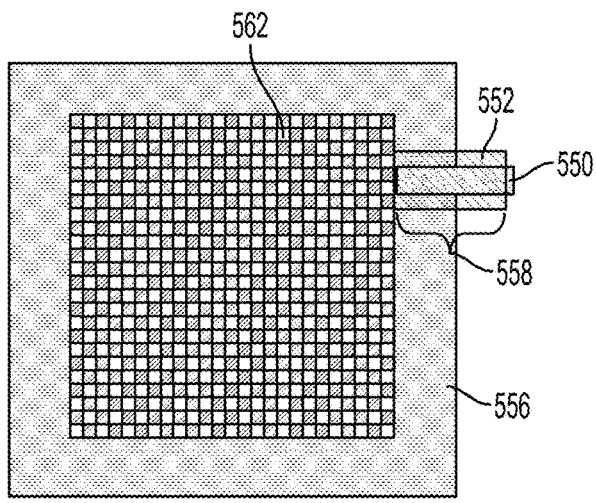
FIGS. 5A-B depict a tops and a side view of a metallic tab embedded between carbon fiber sheets according to some embodiments.
Figure 5B:
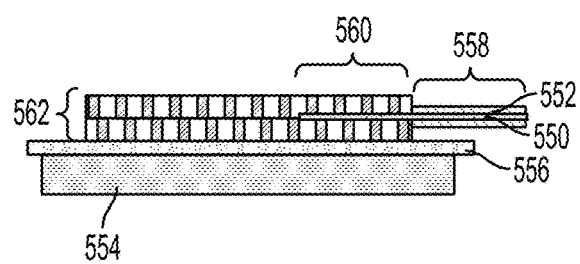

FIG. 5A shows a top view of a stacked configuration of carbon fiber sheets placed on PTFE (polytetrafluoroethylene) sheet 556. A carbon fiber sheet stack-and-PTFE sheet assembly is placed on glass plate 554. FIG. 5B provides a side view of a stacked configuration of carbon fiber sheets 562 including metallic tab 550. Carbon fiber sheet stack 562 is provided on PTFE sheet 556, which is then placed on glass plate 554.

In some embodiments, a non-flat structural energy storage component may be desired. For example, some embodiments include a structural energy storage component formed in the shape of a functional component of a device. Accordingly, some embodiments may include forming the structural energy storage component in the shape of a wing component, fuselage component, boom component, door component, chassis component, etc. Such portions of functional components and/or the entire component itself may not comprise a completely flat surface. Accordingly, instead of forming the structural energy storage component on a flat PTFE sheet and glass plate, some embodiments may form structural energy storage components using molds. For example, a structural energy storage component (electrode and/or battery) according to some embodiments described herein may be molded or formed in a curved shape according to a functional component of a device. In FIG. 1, structural storage energy devices 102 and 104 may be curved according to the design of boom 106 and body 108 with which they correspond. Accordingly, a mold of appropriate shape, curvature, design, etc. may be used instead of the flat glass plate of FIGS. 5A and 5B. Similarly, an appropriate mold release agent may be used instead of the PTFE sheet of FIGS. 5A and 5B.

Figure 6A:
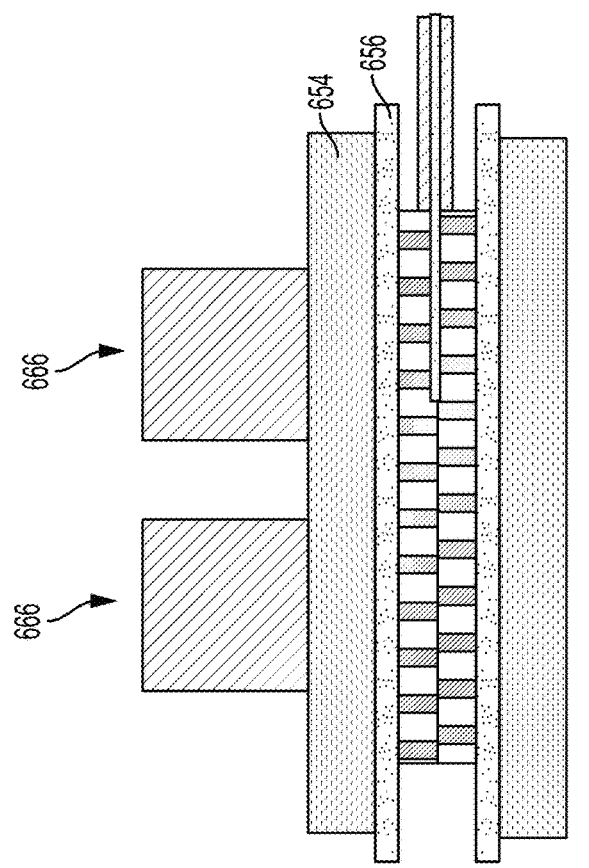
FIGS. 6A-B show polymer infiltration of carbon fiber sheets and metallic tab(s) according to some embodiments.
Figure 6B:
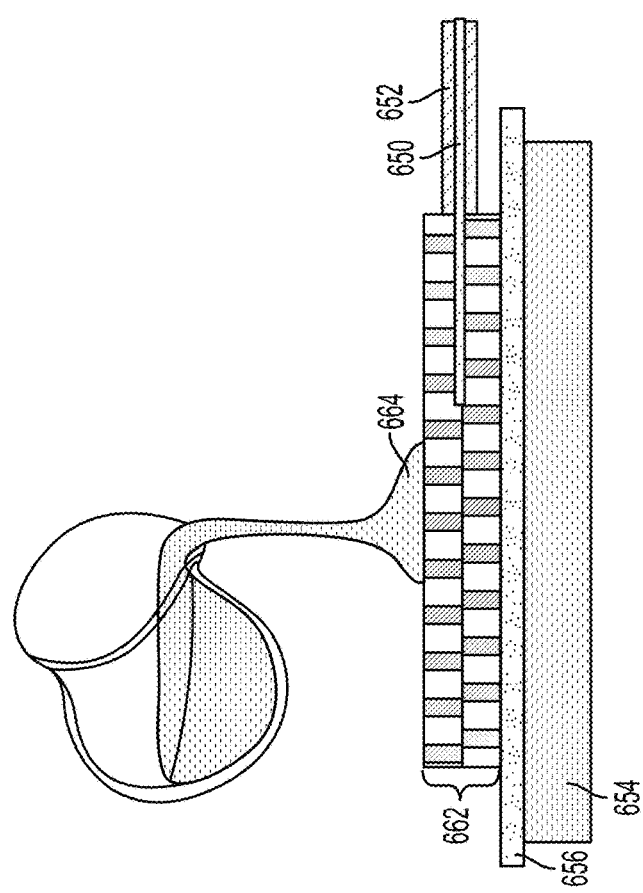

FIGS. 6A and 6B show the fabrication of a carbon fiber-reinforced polymer according to embodiments described herein. FIG. 6A shows polymer 664 infiltration of the carbon fiber sheet stack 662 and metallic tab 650. As described in more detail below, polymer 664 may be a resin/hardener combination or a monomer/initiator combination. Polymer 664 infiltrates the carbon fiber sheet stack-and-metallic tab assembly and may fill any crevices within or between carbon fiber sheets. FIG. 6B shows a side view of the assembly after polymer 664 infiltration. In some embodiments, when the resin/hardener or monomer/initiator 664 is curing, a second PTFE sheet 656 and glass plate 654 may be placed on top of the assembly. Weights 666 may be placed on top of the second PTFE sheet 656 and glass plate 654 to form a flat structural electrode. In some embodiments, as discussed above, a structural energy storage component that is not flat may be molded or formed. For example, a curved or otherwise non-flat mold may be used along with a mold releasing agent in place of the PTFE sheet 656 and glass plate 654. Thus, a structural energy storage component according to embodiments described herein may be fabricated according to the shape of a functional component of a device, as described. After curing, the Kapton tape may be removed to expose metallic tab 650. In some embodiments, another physical mechanism and/or chemical mechanism for preventing epoxy/polymer 664 to adhere to metallic tab 650 may be used. In some embodiments, a physical mechanism or a chemical mechanism known in the art may be used to remove any epoxy/polymer 664 from metallic tab 650 that may have adhered during polymer 664 infiltration.

Figure 7A:
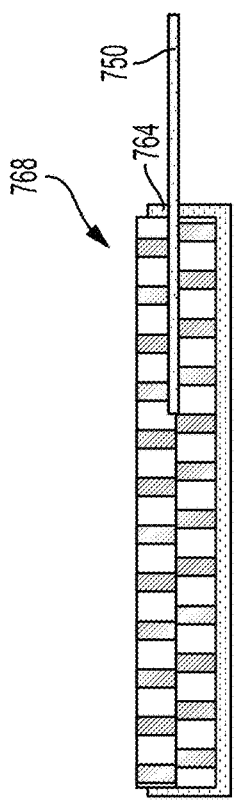
FIGS. 7A-C show a carbon fiber-reinforced polymer having an abraded, conductive side according to some embodiments.
Figure 7B:
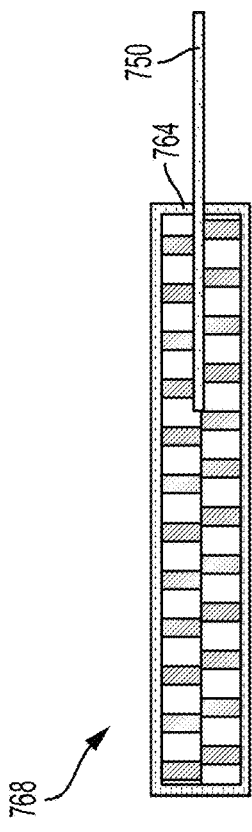
Figure 7C:
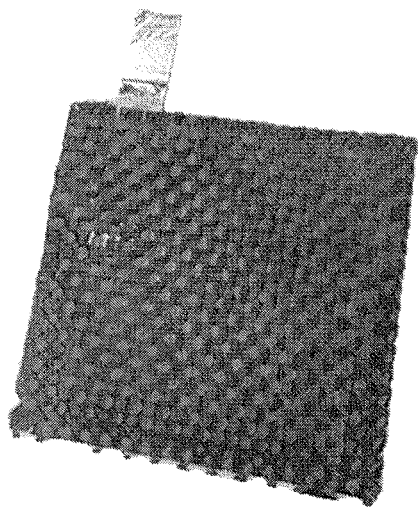

FIGS. 7A-7C demonstrate abrading a side of the carbon fiber-reinforced polymer according to some embodiments described herein. Any method of abrasion or polymer-removal method known in the art may be used to remove any epoxy/polymer formed on a side of the carbon fiber-reinforced polymer. Because polymer 764 is insulating, removing any polymer on at least one side of the carbon fiber-reinforced polymer is necessary to expose a portion of the conductive carbon fiber, which will allow the electrons to travel from metallic tab 750, through the carbon fiber of the carbon fiber-reinforced polymer 768, and to the surface coating or the electrode-electrolyte interface of a structural battery and vice versa. Accordingly, one or more sides of the carbon fiber-reinforced polymer to be abraded may at least be a side that will be exposed to electrolyte within a structural battery. For example, FIG. 7B indicates abrasion of a top side of carbon fiber-reinforced polymer 768. In some embodiments, at least a portion of a top side of carbon fiber-reinforced polymer 768 may be within a structural battery and configured to interact with an electrolyte of the structural battery.

FIG. 7C is a photo of a carbon fiber-reinforced electrode according to some embodiments described herein. The metallic tab of FIG. 7C comprises copper.

Figure 8A:
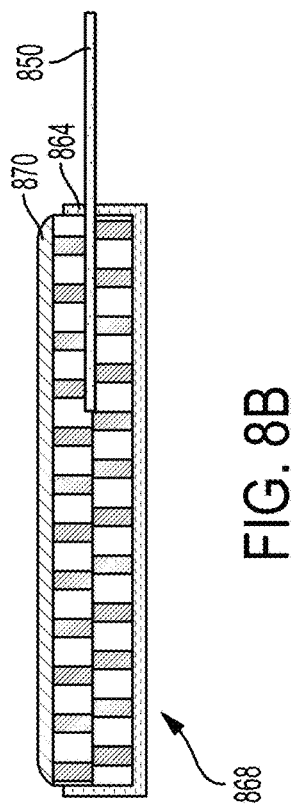
FIGS. 8A-B provide a carbon fiber-reinforced polymer anode with and without a surface coating according to some embodiments.
Figure 8B:
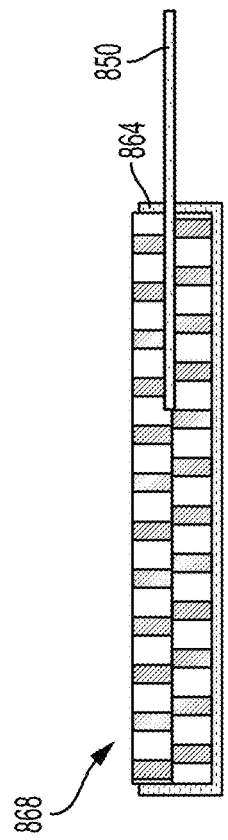

FIGS. 8A and 8B provide side views of at least two different carbon fiber-reinforced anodes according to some embodiments described herein. The anodes of FIGS. 8A and 8B may be used in a single-sided or in a double-sided structural battery cell.

For example, FIG. 8A shows a side view of carbon fiber-reinforced polymer anode 868 including one or more carbon fiber sheets, one or more metallic tab 850, and infiltrating polymer 864. In some embodiments, a carbon fiber-reinforced anode may additionally include surface coating 870. For example, FIG. 8B shows a carbon fiber-reinforced anode comprising a surface coating 870 on the abraded side of the assembly. A surface coating of a carbon fiber-reinforced anode may comprise any active material known in the art including, but not limited to, graphite, silicon, mesoporous carbon microbeads, and/or lithium titanate.

Figure 9A:
FIGS. 9A-C provide examples of cathodes according to some embodiments.
Figure 9B:
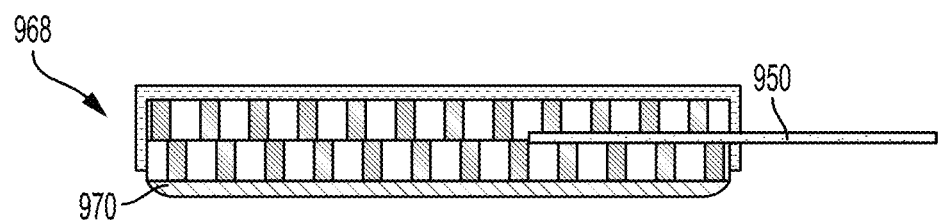
Figure 9C:
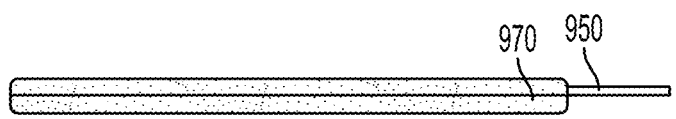

FIGS. 9A-9C provide side views of at least three different cathodes according to some embodiments described herein. For example, FIG. 9A shows a cathode for a single-sided structural battery cell (that does not comprise a carbon fiber-reinforced polymer) according to some embodiments. The cathode of FIG. 9A shows a layer of cathode coating on a layer of aluminum foil. In some embodiments, metallic tab 950 may be spot-welded to the cathode.

FIG. 9B shows a carbon fiber-reinforced polymer cathode for a single-sided call according to some embodiments. In FIG. 9B, metallic tab 950 may be embedded between two or more carbon fiber sheets during fabrication of the carbon fiber-reinforced polymer cathode 968. Additionally, surface coating 970 may be applied to a conductive (or abraded) side of the carbon fiber-reinforced polymer. Surface coating 970 of a carbon fiber-reinforced polymer cathode may include, but is not limited to, lithium cobalt oxide, lithium nickel-manganese-cobalt oxide, and/or lithium iron phosphate.

FIG. 9C shows a cathode for a double-sided structural battery cell (that does not comprise a carbon fiber-reinforced polymer) according to some embodiments. In some embodiments, as described above, metallic tab 950 may be spot-welded to the cathode. Further, some embodiments of cathodes described herein may comprise a surface coating on more than one conductive side of the electrode. For example, FIG. 9C depicts surface coating 970 on both a top and a bottom side of the aluminum foil (cathode material). A surface coating of a cathode may include lithium cobalt oxide, lithium nickel-manganese-cobalt oxide, and/or lithium iron phosphate.

Figure 10A:
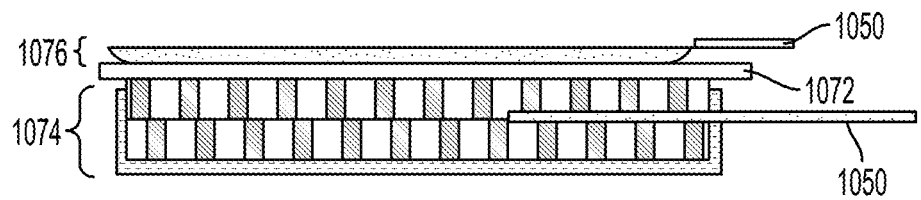
FIGS. 10A-F provide various cell configurations according to some embodiments.
Figure 10B:
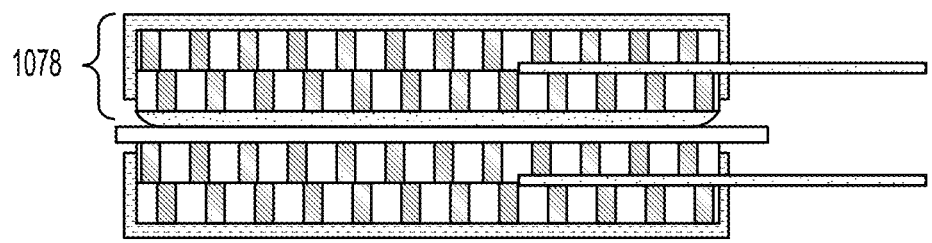
Figure 10C:
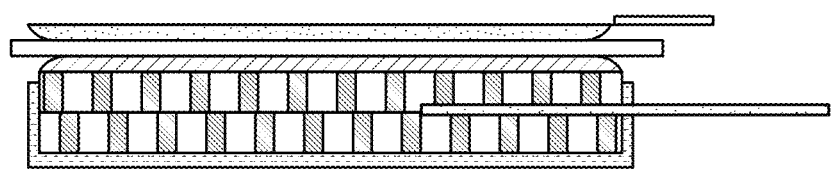
Figure 10D:
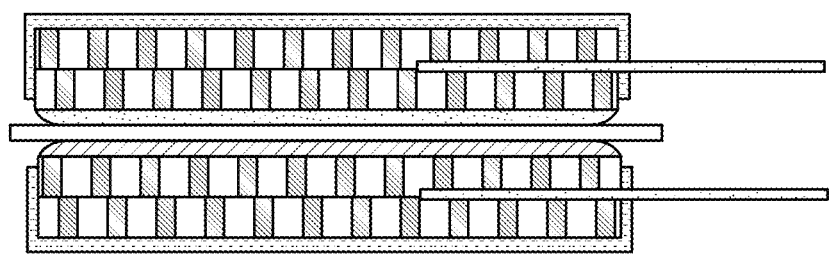
Figure 10E:
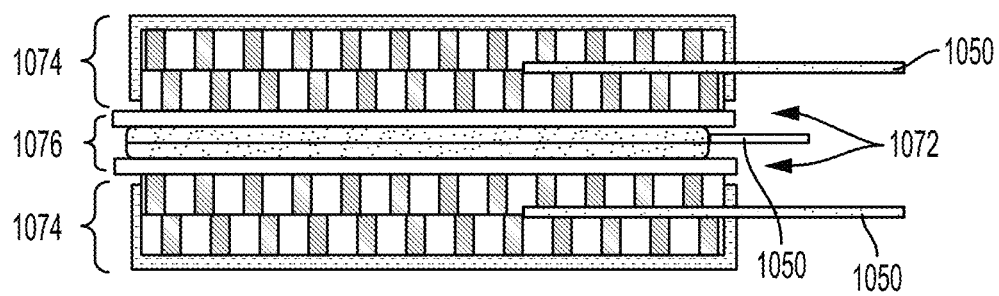
Figure 10F:
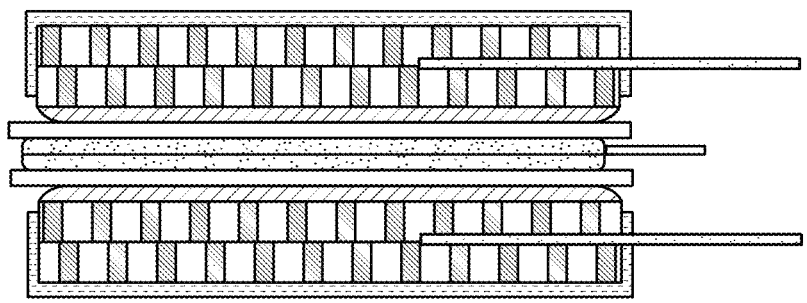

FIGS. 10A-10F provide various structural battery configurations according to some embodiments described herein. Specifically, FIGS. 10A-10D show various configurations of single-sided structural battery cells. FIGS. 10E and 10F show different configurations of double-sided structural battery cells.

FIG. 10A shows a single-sided structural battery cell including one carbon fiber-reinforced polymer electrode (an anode). A cathode of some embodiments may be any conventional cathode known in the art. Separator sheet 1072 may be layered between carbon fiber-reinforced polymer anode 1074 and conventional cathode 1076. Both carbon fiber-reinforced anode 1074 and conventional cathode 1076 may include at least one metallic tab 1050. Some embodiments of a conventional cathode include spot-welding metallic tab 1050 to the cathode. Some embodiments of a carbon fiber-reinforced polymer anode include embedding a portion of metallic tab 1050 between two or more layers of carbon fiber sheets.

FIG. 10B provides a single-sided structural battery cell including two carbon fiber-reinforced polymer electrodes. The single-sided structural battery cell of FIG. 10B, may include carbon fiber-reinforced polymer anode 1074 and carbon fiber-reinforced polymer cathode 1078. Separator sheet 1072 is layered between carbon fiber-reinforced polymer anode 1074 and carbon fiber-reinforced polymer cathode 1078. Additionally, carbon fiber-reinforced polymer cathode 1078 may include a surface coating on a conductive side of the structural battery cell. Both carbon fiber-reinforced anode 1074 and carbon fiber-reinforced polymer cathode 1078 may include at least one metallic tab 1050.

FIG. 10C shows a single-sided structural battery cell according to some embodiments described herein. The structural battery cell of FIG. 10C may include a single carbon fiber-reinforced polymer electrode (an anode) 1074 and conventional cathode 1076. Separator sheet 1072 may be layered between carbon fiber-reinforced polymer electrode 1074 and conventional cathode 1076. However, unlike the structural battery cell depicted in FIG. 10A, the structural battery cell of FIG. 10C includes both a cathode surface coating and an anode surface coating. Accordingly, separator sheet 1072 may be layered directly adjacent to, and in contact with, a surface coating of conventional cathode 1076 and a surface coating of carbon fiber-reinforced polymer anode 1074. Both carbon fiber-reinforced anode 1074 and conventional cathode 1076 may include at least one metallic tab 1050.

FIG. 10D shows a single-sided structural battery cell according to some embodiments described herein. For example, the embodiment depicted in FIG. 10D includes both a carbon fiber-reinforced polymer anode 1074 and a carbon fiber-reinforced polymer cathode 1078. Unlike the structural battery cell of FIG. 10B, which only includes a surface coating on carbon fiber-reinforced cathode 1078, the structural battery cell of FIG. 10D may include a surface coating on both carbon fiber-reinforced polymer anode 1074 and carbon fiber-reinforced polymer cathode 1076.

FIG. 10E provides a double-sided structural battery cell according to some embodiments described herein. Specifically, FIG. 10E shows a double-sided structural battery cell that may include two or more carbon fiber-reinforced polymer anodes 1074 and conventional cathode 1076. Conventional cathode 1076 may include a surface coating on both a top surface and a bottom surface. Additionally, the electrodes—conventional cathode 1076 and two or more carbon fiber-reinforced anodes 1074—may include at least one metallic tab 1050. Metallic tabs 1050 of carbon fiber-reinforced polymer anodes 1074 may be embedded between two or more layers of carbon fiber sheets during fabrication of the carbon fiber-reinforced polymer. Metallic tab 1050 of conventional cathode 1076 may be spot-welded to the cathode material. Further, one or more separator sheets 1072 may be layered between cathode 1076 and each anode 1074. However, because the carbon fiber-reinforced polymer anodes 1074 of FIG. 10E may not include a surface coating, separator sheet 1072 may be layered directly adjacent to, and in contact with, carbon fiber-reinforced anodes 1074.

FIG. 10F provides a double-sided structural battery cell according to some embodiments described herein. Specifically, FIG. 10F shows a double-sided structural battery cell that may include two or more carbon fiber-reinforced polymer anodes 1074 that each may include at least one embedded metallic tab 1050. Metallic tab 1050 may be layered between two or more carbon fiber sheets during fabrication. The structural battery cell of FIG. 10F may also include a double-sided conventional cathode 1076 that may have a metallic tab 1050. Metallic tab 1050 may be spot-welded to the cathode material during fabrication. Further, anodes 1074 and cathode 1076 may include a surface coating on a conductive side of the electrode. Because cathode 1076 is a double-sided conventional cathode, it may include a surface coating on both a top and a bottom surface. Carbon fiber-reinforced anodes 1074 may include a surface coating on a conductive and/or an abraded side of the anode. Separator sheets 1072 may be layered between carbon fiber-reinforced anodes 1074 and double-sided conventional cathode 1076. Because both carbon fiber-reinforced anodes 1074 and conventional cathode 1076 may include surface coatings, separator sheets 1072 may be layered between the electrodes and surface coatings such that separator sheets 1072 are adjacent to, or in contact with, surface coatings of the proximate electrodes.

Figures 11A, 11B:
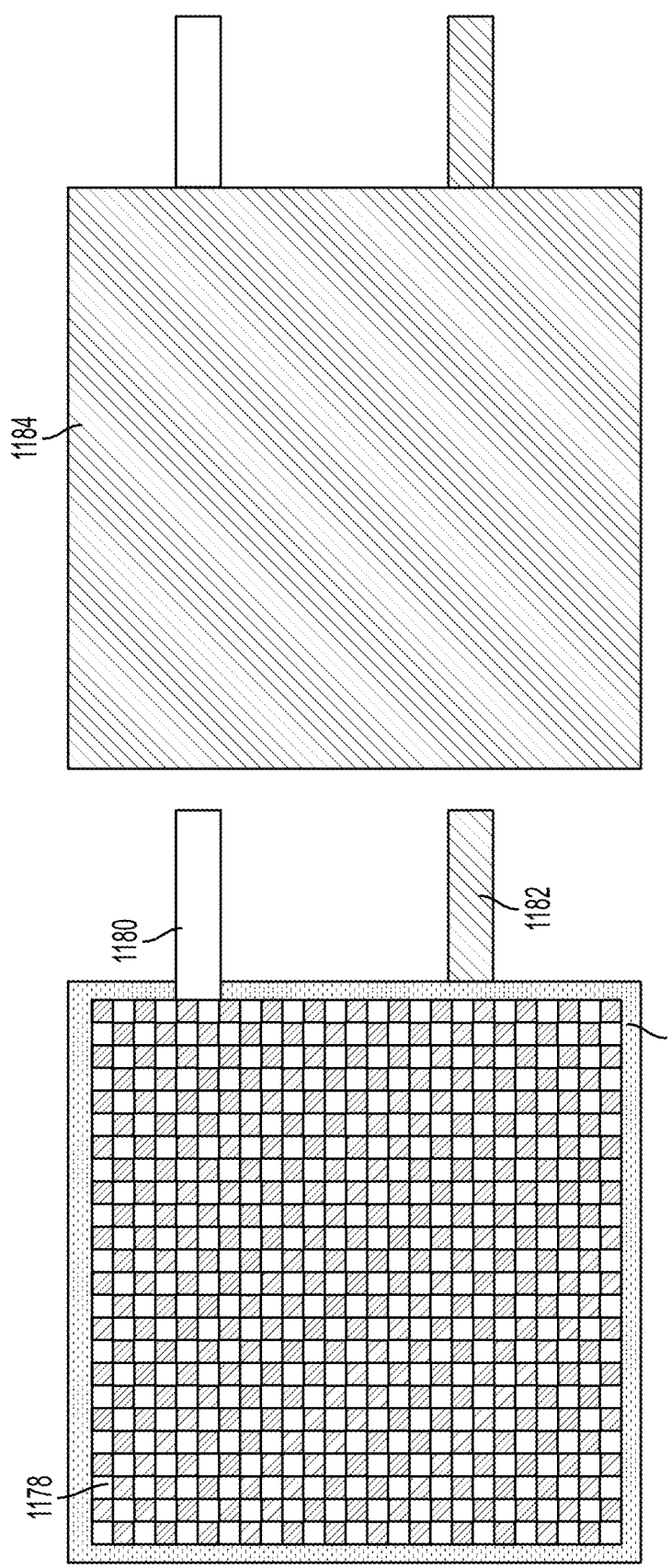
FIGS. 11A-C provide top views of various embodiments of cells described herein.
Figure 11C:
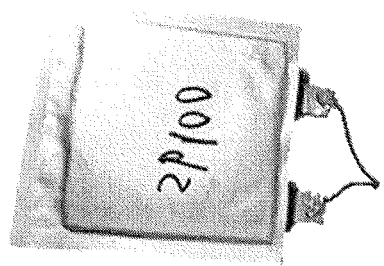

FIGS. 11A-11C provide top views of structural battery cells according to some embodiments described herein. FIG. 11A shows a top view of stacked battery components. For example, the battery components stack of FIG. 11A shows a carbon fiber-reinforced polymer cathode as an uppermost layer, indicated by the carbon fiber sheet and aluminum metallic tab 1180. Aluminum metallic tab 1080 may be embedded between layers of carbon fiber sheets during fabrication of the cathode. Separator sheet 1172 may be layered between an uppermost carbon fiber-reinforced polymer cathode 1078 and a carbon fiber-reinforced polymer anode. Nickel or copper metallic tab 1182 may be embedded between carbon fiber layers of a carbon fiber-reinforced polymer anode.

FIG. 11B shows a top view of a structural battery cell within an environmental barrier 1184. The structural battery cell may include at least two metallic tabs 1050—aluminum tab 1180 for a cathode and nickel or copper tab 1182 for an anode. In some embodiments, environmental barrier 1184 may include a sealant or coating material that may protect the structural battery cell from water and air. In some embodiments, environmental barrier 1184 may be a laminated aluminum pouch that protects structural battery cell from water and air. FIG. 11C provides a photograph of a structural battery cell within an aluminum pouch that protects the structural battery cell from the elements.

Figure 12A:
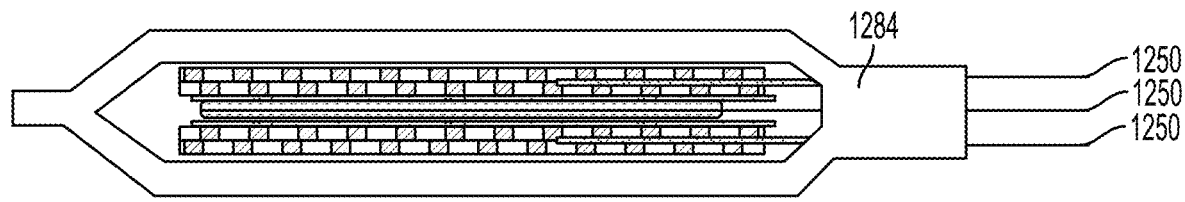
FIGS. 12A-B provide side views of various embodiments of cells described herein.
Figure 12B:
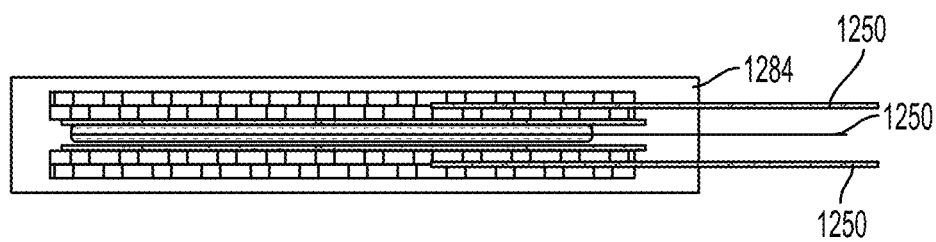

FIGS. 12A and 12B provide side views of different embodiments of environmental barrier 1284. For example, FIG. 12A shows a double-sided structural battery cell protected from the elements by a laminated aluminum pouch as environmental barrier 1284. Metallic tabs 1250 may extend through the aluminum pouch and may extend outwardly to an exterior area of the aluminum pouch surrounding the structural battery cell. The structural battery cell within the aluminum pouch may comprise any one or more features according to the embodiments of structural energy storage components described herein.

FIG. 12B shows a double-sided structural battery cell having an impermeable sealant and/or coating as environmental barrier 1284. This impermeable sealant and/or coating may be any suitable barrier layer. Further, like the structural battery cell of FIG. 12A, metallic tabs 1250 extend through the impermeable sealant and/or coating layer and may extend outwardly to an exterior area of the layer. The structural battery cell within the impermeable sealant and/or coating layer may comprise a configuration according to any of the embodiments of structural energy storage components described herein.

Figure 16:
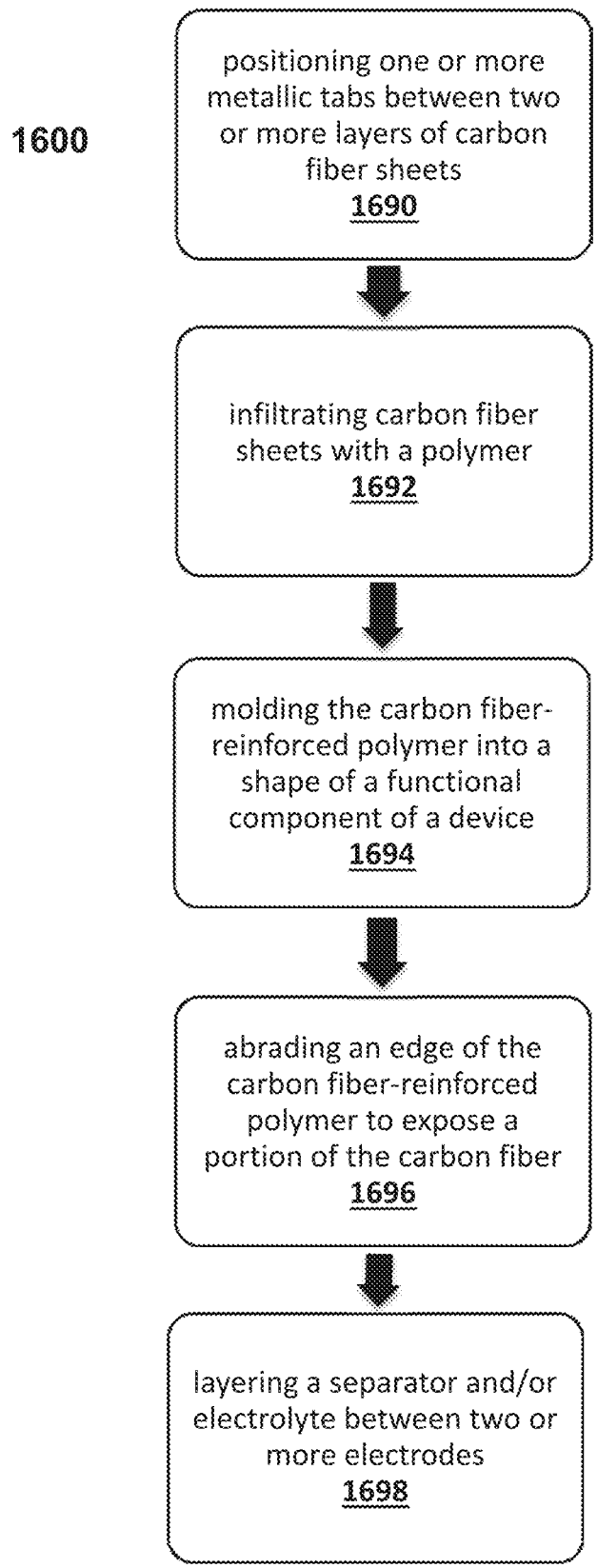
FIG. 16 shows a process diagram of a method of making a structural electrode and a structural battery according to some embodiments.

FIG. 16 provides a process 1600 demonstrating a method of making a structural energy storage component according to some embodiments. For example, a structural electrode may be formed by positioning one or more metallic tabs between two or more layers of carbon fiber sheets 1690, infiltrating the carbon fiber sheets with a polymer to form a carbon fiber-reinforced polymer 1692, molding the carbon fiber-reinforced polymer into a shape of a functional component of a device 1694, and/or abrading an edge of the carbon fiber-reinforced polymer to expose a portion of the carbon fiber 1696. A structural battery may include at least one additional step that includes layering a separator and/or an electrolyte between two or more electrodes 1698, at least one of which is a carbon fiber-reinforced polymer electrode. The method-making steps 1690, 1692, 1694, 1696, and 1698 may be performed in any sequence and in combination with any other steps for making an electrode and/or a battery known in the art.

Fabrication Methods and Techniques for Current Collectors and Electrodes

In some embodiments, electrodes may serve as a structural material as well as an active ion material or current collector. An electrode may be fabricated separately and/or prior to fabricating a structural battery. A method of making an electrode disclosed herein can include providing carbon fiber sheets; embedding one or more metallic tabs between layers of the carbon fiber sheets; infiltrating the carbon fiber sheets with a polymer to form a carbon fiber-reinforced polymer; and abrading a side of the carbon fiber-reinforced polymer sheet to expose the conductive carbon fiber. The following sections describe various materials and steps that can be included in making an electrode for a structural battery.

Carbon Fiber-reinforced Polymer: In some embodiments, carbon fiber sheets can be used to form the base of the electrodes. Carbon fiber sheets may be cut into a desired shape and/or orientation. For example, carbon fiber sheets may be cut in a 0° orientation (with the carbon fibers parallel to an edge) and/or a 45° orientation (with the carbon fibers at a 45° angle to an edge).

The carbon fiber sheets may be oriented in various ways. In some embodiments, a current collector may include both 0° orientation and 45° orientation sheets. In some embodiments, a current collector may include only 0° orientation or only 45° orientation carbon fiber sheets. Some embodiments may include more than two pieces of carbon fiber sheets for increased strength. In some embodiments, carbon fiber sheets may be oriented in alternating layers of 0° orientation sheets and 45° orientation sheets.

The carbon fiber sheets can be, for example, those used in carbon fiber-reinforced plastic. In some embodiments, the carbon fiber sheet can be a woven carbon fiber sheet. For example, the carbon fiber sheets may comprise one or more of 1K plain weave ultralight carbon fiber fabric, 3K plain weave carbon fiber fabric, 3K twill weave carbon fiber, or 12K carbon fiber of Fibreglast Developments Corporation. Any carbon fiber material may be used and woven in to the desired weave. For example, suitable carbon fiber materials provided by Toray include: Toray T300, Toray M46J, and/or Toray T800.

Additionally, graphitic powder may be added to the carbon fiber of the carbon fiber-reinforced polymer. In some embodiments, addition of graphitic powder may increase the specific capacity as much as three times as that exhibited by just the carbon fiber.

The carbon fiber sheets may be aligned and placed on a polytetrafluoroethylene (PTFE) sheet. In some embodiments, the PTFE sheet may be placed on a piece of heat-resistant glass. The PTFE sheet and/or heat-resistant glass may provide a border around the carbon fiber sheets on all sides. For example, the PTFE sheet and/or heat-resistant glass may provide a border of at least one centimeter around the stacked carbon fiber sheets on all sides. The PTFE sheet may be any of various shapes. For example, the PTFE sheet may be flat, or it may be of a concave or a convex curve. In some embodiments, the carbon fiber sheets may be placed onto a flat or a curved PTFE sheet and applied to a curved mold.

Metallic Battery Tabs: Some embodiments may include metallic battery tabs. For example, some embodiments of an electrode may include metallic battery tabs that are in physical and/or electrical contact with the carbon fiber of the carbon fiber-reinforced polymer sheets. In some embodiments, one or more metallic battery tabs may comprise aluminum, copper, nickel, and/or combinations thereof. For example, one or more aluminum battery tabs may be used for a cathode current collector. In some embodiments, one or more copper and/or nickel battery tabs may be used for an anode current collector. An example of an aluminum battery tab that may be used is a 4 mm-width aluminum tab with adhesive polymer tape (MTI Corporation). However, any suitable metallic tab may be used.

Various methods may be used to prevent the polymer from adhering to the metallic tabs or otherwise interfering with the contact between the carbon fiber and metallic tab. In some embodiments, adhesive Kapton tape may be placed on both sides of a metallic tab. After insertion of the metallic tab(s) and addition of a polymer, the tape may be removed from the metallic tab. In some embodiments, a tab may be inserted between two or more carbon fiber sheets such that a 0.2-2 cm length of the tab is embedded within the carbon fiber sheets. In some embodiments, more than 0.2 cm of metallic tab may be embedded within the carbon fiber sheets. In some embodiments, more than 0.3 cm, 0.4 cm, 0.5 cm, 0.6 cm, 0.7 cm, 0.8 cm, 1.0 cm, 1.2 cm, 1.4 cm, 1.5 cm, 1.6 cm, or more than 1.8 cm of metallic tab may be in contact with the carbon fiber sheets. In some embodiments, less than 2.0 cm of metallic tab may be in contact with the carbon fiber sheets. In some embodiments, less than 1.8 cm, 1.6 cm, 1.4 cm, 1.2 cm, 1.0 cm, 0.8 cm, 0.7 cm, 0.6 cm, 0.5 cm, or less than 0.4 cm of metallic tab may be in contact with the carbon fiber sheets. In some embodiments, an exposed part of the metallic tab not between carbon fiber sheets may be covered with Kapton tape.

Epoxy/Polymer Preparation and Infiltration: The epoxy for the carbon fiber-reinforced polymer may be prepared using one or more several different ways known in the art. For example, the epoxy may be prepared similarly to any carbon fiber-reinforced plastic composite. In some embodiments, a two-part epoxy (comprising a resin and a hardener) may be used, such as the System 2000 Epoxy Resin (Fibre Glast Developments Corporation) or similar product. In some embodiments, a liquid acrylate monomer may be used, along with an initiator chemical and heat. A liquid acrylate monomer may comprise ethoxylated (4) pentaerythritol tetraacrylate, tetraethylene glycol dimethacrylate, ethoxylated (30) bisphenol-A diacrylate, propoxylated (3) glyceryl triacrylate, methoxy polyethylene glycol (500) monoacrylate, and/or mixtures of any liquid monomers. A comprehensive list of suitable monomers is provided in Snyder et al., Chemistry of Materials Volume 19, pages 3793-3801 (2007). An initiator chemical may be, for example, tert-butyl peroxide. In some embodiments, an initiator chemical may be mixed with a liquid monomer in an amount between 0.1 and 25 wt %. In some embodiments, the initiator chemical may comprise more than 0.1 wt %, more than 0.5 wt %, more than 1.0 wt %, more than 1.5 wt %, more than 2.0 wt %, more than 2.5 wt %, more than 3.0 wt %, more than 3.5 wt %, more than 4.0 wt %, more than 4.5 wt %, more than 5.0 wt %, more than 5.5 wt %, more than 6.0 wt %, more than 6.5 wt %, more than 7.0 wt %, more than 7.5 wt %, more than 8.0 wt %, more than 8.5 wt %, more than 9.0 wt %, more than 9.5 wt %, more than 10 wt %, more than 12 wt %, more than 15 wt %, more than 18 wt %, more than 20 wt %, or more than 22 wt % of the mixture. In some embodiments, the initiator chemical may comprise less than 25 wt %, less than 22 wt %, less than 20 wt %, less than 18 wt %, less than 15 wt %, less than 12 wt %, less than 10 wt %, less than 8 wt %, less than 6 wt %, less than 5 wt %, less than 4 wt %, less than 3.5 wt %, less than 3.0 wt %, less than 2.5 wt %, less than 2.0 wt %, less than 1.5 wt %, less than 1.0 wt %, or less than 0.5 wt % of the mixture. In some embodiments, the initiator chemical may comprise between 0.1 and 5 wt %, between 1.0 and 4 wt %, or between 1.25 and 2 wt % of the mixture.

In some embodiments, the hardener in a resin-hardener mixture may comprise between 9 wt % and 50 wt %. In some embodiments, the hardener may comprise between 10 wt % and 40 wt %, between 15 wt % and 35 wt %, or between 20 wt % and 30 wt % of a resin-hardener mixture. The hardener may comprise less than 50 wt %, less than 40 wt %, less than 30 wt %, less than 20 wt %, or less than 15 wt % of a resin-hardener mixture. In some embodiments, the hardener of a resin-hardener mixture may comprise more than 9 wt %, more than 15 wt %, more than 25 wt %, more than 35 wt %, or more than 45 wt % of a resin-hardener mixture.

In some embodiments, the resin-hardener mixture or monomer-initiator mixture is spread or poured over the carbon fiber layers to form a lay-up (carbon fiber and epoxy assembly). Generally, between 10 and 100 milligrams of a liquid mixture are required per square centimeter of carbon fiber sheet. Thus, if two carbon fiber sheets are used, between 20 and 200 milligrams/cm² are required; if three carbon fiber sheets are used, between 30 and 300 milligrams/cm² are required, and so on. In some embodiments, more than 10 mg/cm² carbon sheet are required, more than 15 mg/cm² carbon sheet, more than 20 mg/cm² carbon sheet, more than mg/cm² carbon sheet, more than 40 mg/cm² carbon sheet, more than 50 mg/cm² carbon sheet, more than mg/cm² carbon sheet, more than 70 mg/cm² carbon sheet, or more than 80 mg/cm² carbon sheet are required. In some embodiments, less than 100 mg/cm² carbon sheet, less than 90 mg/cm² carbon sheet, less than 80 mg/cm² carbon sheet, less than 70 mg/cm² carbon sheet, less than 60 mg/cm² carbon sheet, less than 50 mg/cm² carbon sheet, or less than 40 mg/cm² carbon sheet, less than 30 mg/cm² carbon sheet, or less than 20 mg/cm² carbon sheet are required. In some embodiments, between 15 and 90 mg/cm² carbon sheet, between 20 and 80 mg/cm² carbon sheet, between 25 and 70 mg/cm² carbon sheet, between 25 and 60 mg/cm² carbon sheet, or between 25 and 50 mg/cm² carbon sheet are required.

In some embodiments, once the carbon fiber sheet layers are infiltrated with the resin-hardener mixture or monomer-initiator mixture, a second PTFE sheet may be placed on top of the lay-up. In some embodiments, a second glass plate is placed on top of the PTFE. Weights may then be placed on top of this entire assembly to keep the layers flat. In some embodiments, a vacuum-bag system may be used to keep the carbon and epoxy pressed to the mold. For example, a vacuum-bag system may be used for assemblies comprising curved PTFE sheets and/or curved molds. A curved mold may comprise fiberglass, plastic, or any other suitable material. For assemblies comprising a monomer-initiator mixture, the assembly may be placed in an oven at the desired temperature according to the chemical initiator used. The temperature is determined according to the initiator used. For example, an assembly comprising tert-butyl acrylate may be placed in an oven at 140° C. for four hours.

After the required time of curing and/or heating, the fabrication materials (including glass plates, PTFE sheets, Kapton tape, and excess cured epoxy) may be removed from the current collector assembly. In some embodiments, one or more surfaces of the formed current collector assembly may be abraded to expose the carbon fiber.

Abrasion of Carbon Fiber-reinforced Polymer: The surface of the carbon fiber-reinforced polymer, upon fabrication, is generally not conductive. The carbon fiber of the carbon fiber-reinforced polymer is conductive, however, and must be exposed for the carbon fiber-reinforced polymer to serve as an electrode. Once exposed, the conductivity of the carbon fiber-reinforced polymer may also be tested and verified.

Various methods may be used to abrade a surface of a current collector assembly. In some embodiments, a surface of one side of a current collector may be sanded. For example, a surface of the assembly may be sanded using an electric sander with 200- to 800-grit sandpaper. In some embodiments, scraping may be used to expose the carbon fiber of the current collector assembly. Some embodiments may use chemical exposure. However, any abrasion method known in the art may be used to expose a portion of the carbon fiber of the carbon fiber-reinforced polymer.

In some embodiments, a side of the carbon fiber-reinforced polymer may be scraped, sanded, or otherwise abraded to expose a portion of the carbon fiber. This exposed carbon fiber may be oriented during structural battery fabrication such that it is in contact with an electrolyte.

Surface Coating with Active Materials: The carbon fiber-reinforced polymer assembly may be used as an active material at an anode and as a current collector at one or both electrodes. In some embodiments, a surface of a carbon fiber-reinforced polymer current collector may be coated with one or more active materials to increase charge-storage capacity. For example, a carbon fiber-reinforced polymer anode may be coated with graphite, silicon, mesoporous carbon microbeads, and/or lithium titanate on a conductive side. A carbon fiber-reinforced polymer cathode may be coated with lithium cobalt oxide on a conductive side. In some embodiments, a carbon fiber-reinforced polymer cathode may be coated with lithium cobalt oxide. Some embodiments of a carbon fiber-reinforced polymer cathode may include active materials such as lithium nickel-manganese-cobalt oxide and/or lithium iron phosphate.

Fabrication Methods and Techniques for Structural Batteries

Any of the electrodes previously disclosed herein can be incorporated into a structural battery. A structural battery can include at least two electrodes and at least one separator. In some embodiments, the structural battery can include a liquid electrolyte or a gel electrolyte.

Separator: In some embodiments, a structural battery can include at least one separator between two or more electrodes. For example, separator material may include porous polyolefin film such as that provided by Celgard. In some embodiments, separator material may include porous glass microfiber, such as products provided by Whatman®. In some embodiments, the separator may be glass, plastic, a polyolefin, and/or a porous polyolefin sheet. In some embodiments, the electrolyte may be a gel electrolyte and a separator may not be necessary.

Structural batteries may be single-sided or double-sided. In some embodiments of a double-sided cell, the battery layers may be stacked in the order of: a first carbon fiber-reinforced polymer anode, a separator(s), a double-sided cathode coating, a separator(s), a carbon fiber-reinforced polymer anode. The conductive side of each carbon fiber anode should be in contact with its respective adjacent separator. In some embodiments of a single-sided cell, the battery layers may be stacked in the order of: a first carbon fiber-reinforced polymer anode, a separator(s), a cathode coating on aluminum and/or carbon fiber.

In some embodiments, the components of the structural battery may be oriented in a stacked configuration. For example, a first electrode may be placed on top of a separator, and the separator may be placed on top of a second electrode. In some embodiments, the components of the structural battery may be oriented in a side-by-side configuration. For example, a first electrode, a separator, and a second electrode may each be placed adjacent to one another.

Some embodiments can use electrodes and separators of rectangular, circular, triangular, or other geometric shapes. The initial 2D shape of the components can be trivial and may be limited by the ability to maintain the fiber weave of the carbon.

Once oriented, the multiple battery layers may be held together temporarily. Multiple battery layers may be temporarily bound together using one or more clamps, clips, weights, or the like. In some embodiments, the carbon fiber-reinforced polymer may be engineered to act as a barrier to oxygen and water.

In some embodiments, the stacked multiple battery layers may be placed between layers of aluminum film to form a cell assembly. For example, a pouch may be constructed using laminated aluminum film (MTI Corporation). One or more pieces of aluminum film may be cut such that the film is large enough to provide a border around the carbon fiber-reinforced polymer assemblies. In some embodiments, the stacked battery layers may be placed between two cut pieces of laminated aluminum film. In some embodiments, the stacked battery layers may be placed into a folded single piece of aluminum film, such that the very bottom layer and the very top layer of the aluminum film-battery layer assembly is the laminated aluminum film. In some embodiments, sides of the aluminum film may be sealed such that at least one side remains open. For example, three sides of a rectangular pouch may be sealed with a heated impulse sealer. However, any sealing tool known in the art may be used.

A cell assembly may be treated in an oven and an unheated antechamber. In some embodiments, a cell assembly may be treated in a heated antechamber. Both methods of treatment are described in detail below.

A cell assembly may be placed in an oven. In some embodiments, the cell assembly may be heated in an oven for between 15 minutes and 120 minutes. The cell assembly may be heated for more than 15 minutes, more than 30 minutes, more than 45 minutes, more than 60 minutes, more than 75 minutes, more than 90 minutes, or more than 105 minutes. The cell assembly may be heated in an oven for less than 120 minutes, less than 105 minutes, less than 90 minutes, less than 75 minutes, less than 60 minutes, less than 45 minutes, or less than 30 minutes. In some embodiments, the cell assembly may be heated for between 15 minutes and 105 minutes, between 30 minutes and 90 minutes, between 45 minutes and 75 minutes, or between 55 minutes and 65 minutes.

The cell assembly may be heated in an oven at a temperature between 100° C. and 200° C. The cell assembly may be heated in an oven at a temperature greater than 100° C., greater than 110° C., greater than 120° C., greater than 130° C., greater than 150° C., greater than 160° C., greater than 175° C., or greater than 190° C. The cell assembly may be heated in an oven for less than 200° C., less than 180° C., less than 160° C., less than 150° C., less than 140° C., less than 125° C., or less than 110° C. In some embodiments, the cell assembly may be heated in an oven at a temperature between 100° C. and 180° C., between 100° C. and 150° C., or between 110° C. and 130° C.

The cell assembly may be transferred from an oven to an unheated antechamber of a dry box (i.e. glove box). The unheated antechamber may comprise argon gas. In some embodiments, the cell assembly may be placed under vacuum in the glove box, for example, for between 10 and 24 hours. The cell assembly may be placed under vacuum for more than 10 hours, more than 12 hours, more than 14 hours, more than 15 hours, more than 16 hours, more than 18 hours, more than 20 hours, or more than 22 hours. In some embodiments, the cell assembly may be placed under vacuum for less than 24 hours, less than 22 hours, less than 20 hours, less than 18 hours, less than 16 hours, less than 15 hours, less than 14 hours, or less than 12 hours. In some embodiments, the cell assembly may be placed under vacuum for between 12 and 22 hours, between 12 and 20 hours, between 14 and 20 hours, or between 16 and 18 hours. In some embodiments, after being under vacuum in a glove box, the cell assembly may be placed in a dry box.

The cell assembly may be placed in a heated antechamber of a dry box for between 10 and 24 hours. In some embodiments, the cell assembly may be placed a heated antechamber for more than 10 hours, more than 12 hours, more than 14 hours, more than 15 hours, more than 16 hours, more than 18 hours, more than 20 hours, or more than 22 hours. In some embodiments, the cell assembly may be placed in a heated antechamber for less than 24 hours, less than 22 hours, less than 20 hours, less than 18 hours, less than 16 hours, less than 15 hours, less than 14 hours, or less than 12 hours. In some embodiments, the cell assembly may be placed in a heated antechamber for between 12 and 22 hours, between 12 and 20 hours, between 14 and 20 hours, or between 16 and 18 hours.

The cell assembly may be placed in a heated antechamber of a dry box at a temperature between 100° C. and 200° C. The heated antechamber may comprise argon gas. In some embodiments, the cell assembly may be heated in an oven at a temperature greater than 100° C., greater than 110° C., greater than 120° C., greater than 130° C., greater than 150° C., greater than 160° C., greater than 175° C., or greater than 190° C. The cell assembly may be heated in an oven for less than 200° C., less than 180° C., less than 160° C., less than 150° C., less than 140° C., less than 125° C., or less than 110° C. In some embodiments, the cell assembly may be heated in an oven at a temperature between 100° C. and 180° C., between 100° C. and 150° C., or between 110° C. and 130° C. After being treated in a heated antechamber of a dry box, the cell assembly may be transferred to a dry box.

After a cell assembly has been treated in an antechamber of a dry box, an electrolyte solution may be added to the cell assembly. An electrolyte solution may be dispensed into the pouch with a pipette, for example. In some embodiments, the amount of electrolyte to be dispensed may be an amount between 25 and 150 μL per square centimeter. In some embodiments, the amount of electrolyte to be dispensed may be greater than 25 μL per square centimeter, greater than 50 μL per square centimeter, greater than 75 μL per square centimeter, greater than 100 μL per square centimeter, greater than 125 μL per square centimeter, greater than 150 μL per square centimeter, or greater than 175 μL per square centimeter. In some embodiments, the amount of electrolyte to be dispensed may be less than 200 μL per square centimeter, less than 175 μL per square centimeter, less than 150 μL per square centimeter, less than 125 μL per square centimeter, less than 100 μL per square centimeter, less than 75 μL per square centimeter, or less than 50 μL per square centimeter. The amount of electrolyte to be dispensed may be between 25 and 125 μL per square centimeter, between 50 and 100 μL per square centimeter, between 50 and 75 μL per square centimeter, or between 75 and 100 μL per square centimeter.

After an electrolyte is added to the cell assembly, any remaining opening sides of the aluminum pouch may be heat-sealed. Any remaining opening sides of the aluminum pouch may be sealed while the cell assembly is still in the dry box. In some embodiments, a heat impulse sealer may be used to seal any opening sides of the aluminum pouch. However, any sealing tool known in the art may be used.

Alternately, an impermeable coating or sealant may be used instead of the laminated aluminum film pouch. For example, the impermeable coating or sealant is applied in the dry box to all but two small locations on the outer surfaces of the battery cell assembly. The coating/sealant is then allowed to cure. The electrolyte solution may be dispensed into the battery cell through one of the unsealed locations. Gas from any dead space in the battery cell may escape through the other unsealed location. The impermeable coating or sealant may then be applied to the two unsealed locations and allowed to cure such that the entire battery cell is sealed.

The sealed structural battery cell is removed from the dry box for electrochemical testing.

Electrolyte: The structural batteries according to embodiments described herein may include a liquid electrolyte. In some embodiments, the liquid electrolyte can be an ionic liquid. A liquid electrolyte may be added to the structural battery assembly within an argon-rich environment. For example, the structural battery assembly may be placed in a glove box or dry box comprising argon gas. A liquid electrolyte may be added to the aluminum pouch and allowed to infiltrate the structural battery assembly.

In some embodiments, a gel electrolyte may be used. For example, a gel electrolyte may include a combination of a polymer and a liquid electrolyte. A polymer of a gel electrolyte may be poly(ethylene oxide), polyethylene glycol, or another suitable polymer for gel electrolytes.

Various types of liquid electrolytes may be used (for both a liquid electrolyte and/or a gel electrolyte comprising a liquid electrolyte). In some embodiments, the liquid electrolyte solution may comprise a salt and a solvent. The salt of the liquid electrolyte solution may be lithium hexafluorophosphate. The salt may also be lithium tetrafluoroborate, lithium perchlorate, lithium bis(trifluoromethylsulfonyl)imide, lithium trifluoromethanesulfonate. In some embodiments, the solvent may be a mixture of ethylene carbonate and ethyl methyl carbonate. The solvent may also comprise mixtures of ethylene carbonate, propylene carbonate, dimethyl carbonate, and/or diethyl carbonate.

In some embodiments, the liquid electrolyte solution may be one molar lithium hexafloraphosphate dissolved in a mixture of ethylene carbonate and ethyl methyl carbonate. The electrolyte solution may comprise a mixture of a lithium salt with ionic liquid such as 1-ethyl-3-methylimidazolium bis(trifluoromethylsulfonyl)imide.

In some embodiments, a liquid electrolyte and/or gel electrolyte can infiltrate the separator layer(s) and the electrodes rather than being a separate layer itself. For example, the liquid electrolyte and/or gel electrolyte may get into a vast majority of the crevices and voids of the electrodes and/or separators.

The electrolyte may comprise about 5-90%, about 10-80%, about 20-70%, about 30-60%, about 30-50%, about 35-45%, or about 40% of the total structural battery weight. In some embodiments, liquid electrolyte may comprise no more than 40%, no more than 30%, no more than 20%, no more than 15%, no more than 10%, no more than 5%, or no more than 2% of the total structural battery weight. In some embodiments, liquid electrolyte may comprise no less than 1%, no less than 3%, no less than 5%, no less than 10%, no less than 15%, no less than 20%, no less than 30%, or no less than 35% of the total structural battery weight.

Fabrication Sequencing: The structural batteries described herein can be electrically stacked in series and/or in parallel. The structural batteries described herein can be mechanically layered in series and/or in parallel. In addition, one electrode for a first battery can be used as an electrode for a second battery in series and/or in parallel. The specific battery components and fabrication sequencing explored above is not intended to be exhaustive. A person having ordinary skill in the art can readily identify other component and sequencing combinations of which are meant to be covered by the disclosure herein.

Properties: The structural batteries disclosed herein can have a specific energy of at least 0.02, at least 0.05, at least 0.1, at least 0.15, at least 2.0, at least 2.5, at least 3.0, at least 3.5, at least 4.0, at least 5.0, or at least 10.0 Wh/kg. In some embodiments, the structural batteries disclosed herein can have a specific energy between 0.05 and 0.40, between 0.1 and 0.35, or between 0.1 and 0.3 Wh/kg. The structural batteries disclosed herein can have a flexural strength of at least 20, at least 30, at least 35, at least 40, at least 45, at least 50, at least 55, at least 60, or at least 100 MPa. In some embodiments, the structural batteries disclosed herein can have a flexural strength between 20-100, 30-90, 40-80, or 50-70 MPa. The structural batteries disclosed herein can have a flexural modulus of at least 0.5, at least 1, at least 1.5, at least 2, at least 2.5, at least 3, at least 3.5, at least 4, at least 5, or at least 10 GPa. In some embodiments, the structural batteries disclosed herein can have a flexural modulus between 0.5 and 10 GPa, between 1 and 8 GPa, or between 2.5 and 5 GPa.

EXAMPLES

The following are example structural batteries and tests of example structural batteries conducted by Applicants.

The structural battery may be tested with a galvanostat or battery cycler. Galvanostatic cycling may be performed on the cell at a current density of 0.2 to 1.0 milliamps per square-centimeter of cell area. An upper voltage limit of 4.2 V and a lower voltage limit of 3.0 V may be used during the galvanostatic cycling. The battery may be charged and discharged for at least 10 cycles. The resulting capacity and voltage values can be used to calculate specific capacity, specific energy, and coulombic efficiency over multiple cycles.

Figure 13A:
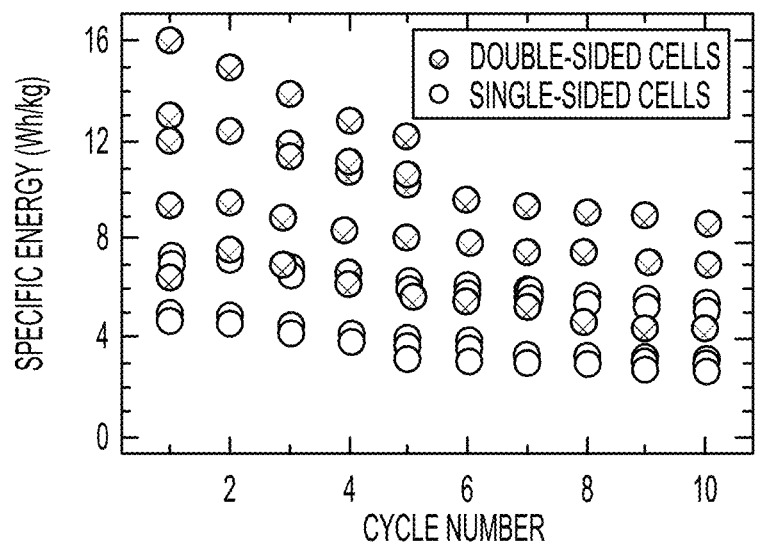
FIGS. 13A-C provide testing data for single-sided and double-sided cells according to some embodiments.
Figure 13B:
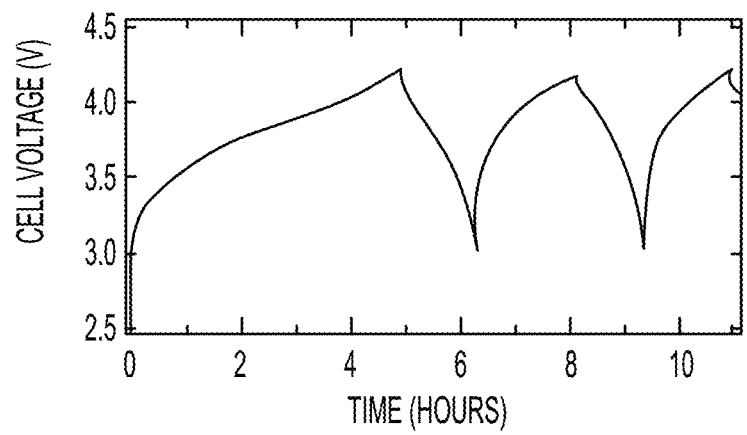
Figure 13C:
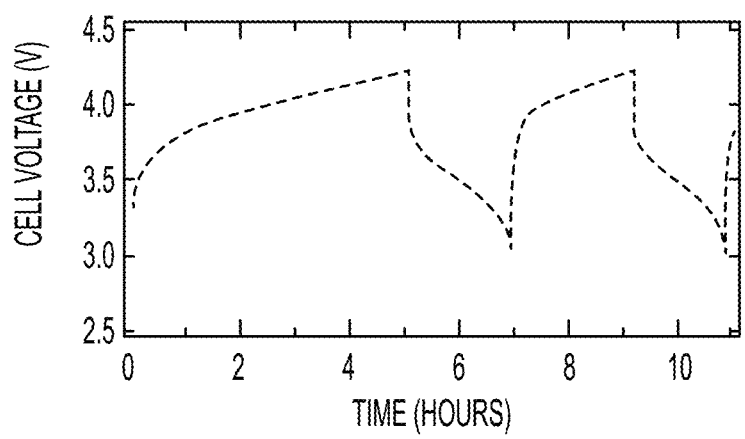

FIGS. 13A-13C provide galvanostatic charge-discharge cycling data for cells according to some embodiments described herein. The results of testing were normalized to accommodate variations in total cell weight. Specifically, FIG. 13A shows data for single-sided cells and double-sided cells. Five replicate double-sided cells were tested with a current density of 0.8 mA/cm$^2$. Four replicate single-sided cells were tested with a current density of 0.4 mA/cm$^2$. The graph of FIG. 13A shows the specific energy (Wh/kg) of the cells over 10 charge-discharge cycles.

FIG. 13B shows data from a double-sided cell having a carbon fiber-reinforced polymer anode with a surface coating and 0.8 mA/cm$^2$ current density. Specifically, the graph shows the cell voltage (V) of the double-sided cell over a period of approximately 11 hours of galvanostatic charge-discharge cycling.

FIG. 13C provides data for a single-sided cell having a carbon fiber-reinforced polymer anode with a surface coating and 0.4 mA/cm$^2$ current density. Specifically, the graph shows cell voltage (V) of the single-sided cell over a period of approximately 11 hours of galvanostatic charge-discharge cycling.

Figure 14A:
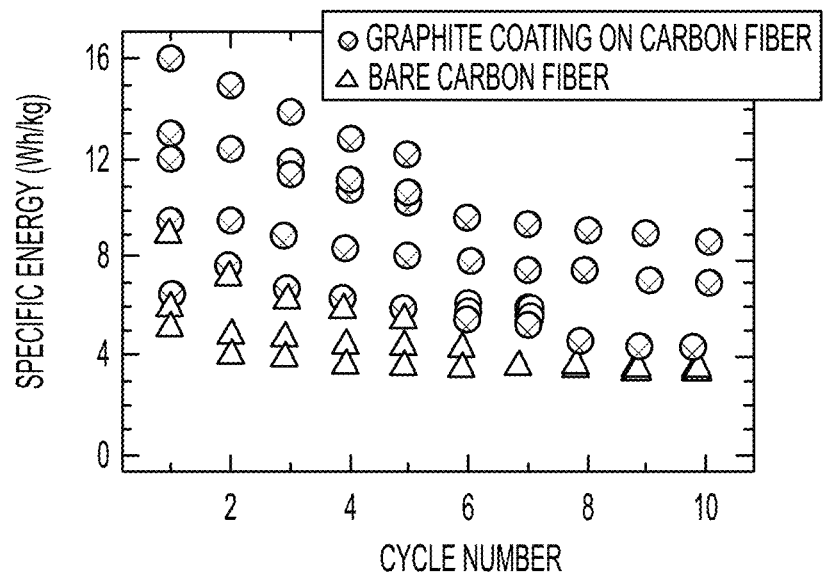
FIGS. 14A-C provide testing data for cells having bare carbon fiber anodes and graphite-coated carbon fiber anodes according to some embodiments.
Figure 14B:
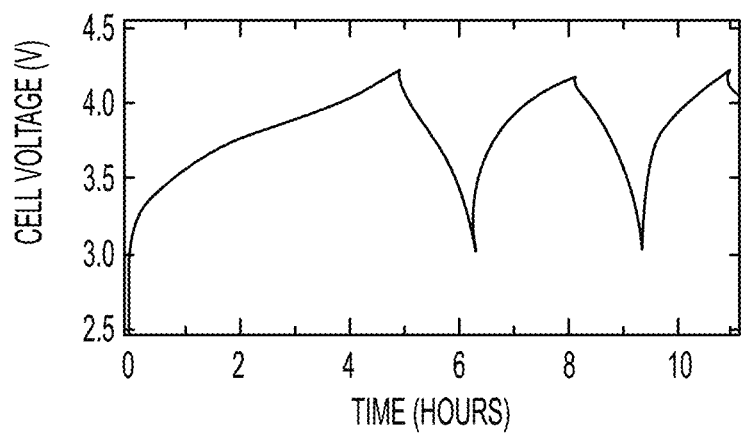
Figure 14C:
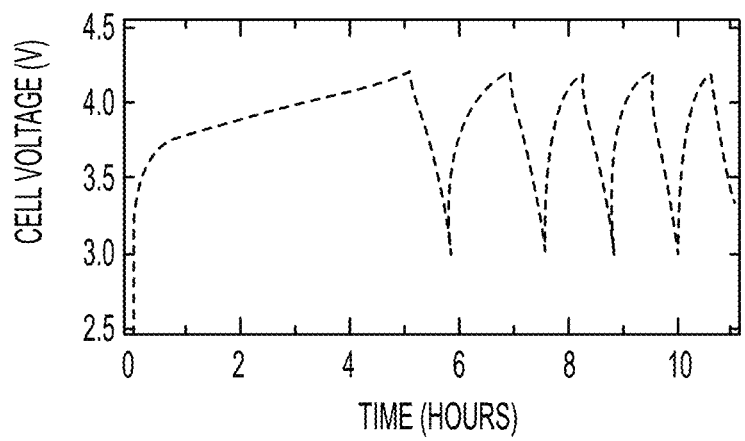

FIGS. 14A-14C show data of galvanostatic charge-discharge cycling for two embodiments of double-sided cells. The results of testing were normalized to accommodate variations in total cell weight. In FIG. 14A, the circular data points represent data from five replicate double-sided cells having a carbon fiber-reinforced polymer anode with a graphitic surface coating. The triangular data points represent data from three replicate double-sided cells having a carbon fiber-reinforced polymer anode with no surface coating. The current density of both double-sided cells was tested at 0.8 mA/cm$^2$. The graph of FIG. 14A shows the specific energy (Wh/kg) of the cells over a series of 10 charge-discharge cycles.

FIG. 14B shows data from a double-sided cell having a carbon fiber-reinforced polymer anode with a graphitic surface coating and 0.8 mA/cm$^2$ current density. Specifically, the graph shows the cell voltage (V) of the double-sided cell over a period of approximately 11 hours of galvanostatic charge-discharge cycling.

FIG. 14C shows data from a double-sided cell having a carbon fiber-reinforced polymer anode without a surface coating and 0.8 mA/cm$^2$ current density. Specifically, the graph shows the cell voltage (V) of the double-sided cell over a period of approximately 11 hours of galvanostatic charge-discharge cycling.

Figure 15A:
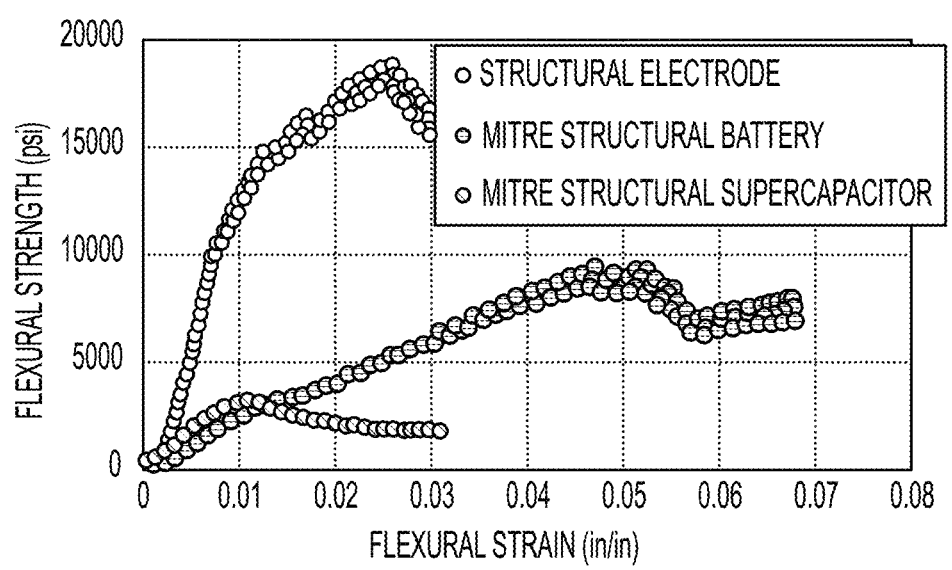
FIGS. 15A-C provide mechanical testing data for structural electrodes and structural batteries according to some embodiments.

FIG. 15A provides the stress and strain behavior of a structural electrode according to any one or more of the embodiments described herein, a structural battery according to any one or more of the embodiments described herein, and a structural supercapacitor. The y-axis represents the flexural strength (psi) and the x-axis represents the flexural strain (in/in) of the energy storage devices.

Figure 15B:
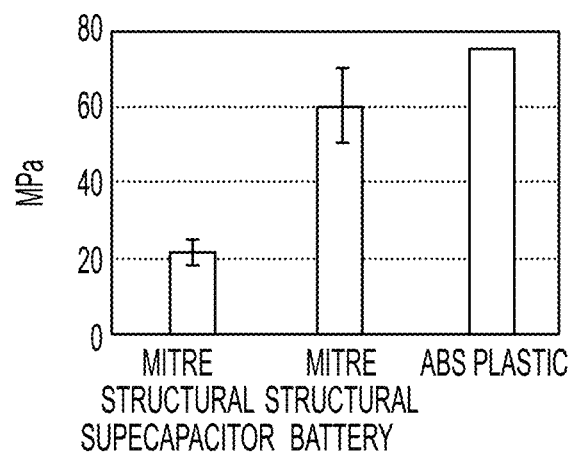

FIG. 15B shows the flexural strength (MPa) of a structural supercapacitor, a structural battery according to any one or more of the embodiments described here, and a sample of acrylonitrile butadiene styrene (ABS) plastic.

Figure 15C:
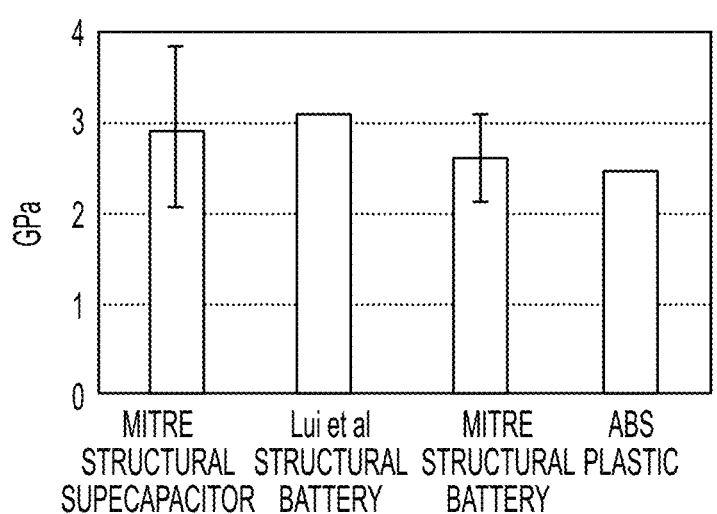

FIG. 15C shows the elastic modulus (GPa) of a structural supercapacitor, a structural battery according to Liu et al (Design and Fabrication of multifunctional structural batteries, 189 J. of Power Sources 1, 646 (2009)), a structural battery according to any one or more of the embodiments described herein, and ABS plastic.

This application discloses several numerical ranges in the text and figures. The numerical ranges disclosed inherently support any range or value within the disclosed numerical ranges even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein.

The invention claimed is:

1. A structural battery for a device comprising:
   one or more carbon fiber-reinforced polymer electrodes comprising two or more carbon fiber sheets, one or more metallic tabs, and a polymer, and
   a liquid electrolyte,
   wherein the structural battery is molded into a shape of a functional component of a device.

2. The structural battery of claim 1, wherein at least a portion of the shape of the functional component comprises an exterior surface of the device.

3. The structural battery of claim 2, wherein the exterior surface of the device is functional.

4. The structural battery of claim 2, wherein the exterior surface is configured to increase the aerodynamic performance of the device.

5. The structural battery of claim 1, wherein the device is a ground vehicle or an aerial vehicle.

6. The structural battery of claim 1, wherein the functional component comprises one or more of a component of: a wing, a boom, a body, a chassis, or a door of a device.

7. The structural battery of claim 1, further comprising a surface coating on one or more surfaces of the one or more carbon fiber-reinforced polymer electrodes.

8. The structural battery of claim 7, wherein the surface coating comprises an active material comprising one or more of graphite, silicon, mesoporous carbon microbeads, lithium titanate, lithium cobalt oxide, lithium nickel-manganese-cobalt oxide, or lithium iron phosphate.

9. The structural battery of claim 1, further comprising one or more separators between two or more electrodes of the structural battery.

10. The structural battery of claim 1, wherein the structural battery is a single-sided battery comprising layers in the order of a carbon fiber-reinforced anode, a separator, and a cathode coating on a layer of aluminum.

11. The structural battery of claim 1, wherein the structural battery is a double-sided battery comprising layers in the order of a carbon fiber-reinforced anode, a separator, a double-sided cathode coating, a separator, and a carbon fiber-reinforced anode.

12. The structural battery of claim 1, wherein the liquid electrolyte comprises one or more of lithium hexafluorophosphate, lithium tetrafluoroborate, lithium perchlorate, lithium bis(trifluoromethylsulfonyl)imide, lithium trifluoromethanesulfonate, ethylene carbonate, ethyl methyl carbonate, propylene carbonate, dimethyl carbonate, or diethyl carbonate.

13. The structural battery of claim 1, wherein the one or more metallic tabs comprise aluminum, copper, or nickel.

14. The structural battery of claim 1, wherein an edge of the one or more carbon fiber-reinforced polymer electrodes is abraded using physical abrasion or chemical abrasion to expose a portion of the carbon fiber of the electrode.

15. The structural battery of claim 1, wherein the polymer comprises a liquid acrylate monomer and an initiator.

16. The structural battery of claim 15, wherein the liquid acrylate monomer comprises ethoxylated (4) pentaerythritol tetraacrylate, tetraethylene glycol dimethacrylate, ethoxylated (30) bisphenol-A diacrylate, propoxylated (3) glyceryl triacrylate, methoxy polyethylene glycol (500) monoacrylate, or any combination thereof.

17. The structural battery of claim 15, wherein the initiator is tert-butyl peroxide.

18. The structural battery of claim 15, wherein the initiator comprises more than 0.1 wt % of an initiator-liquid monomer mixture.

19. The structural battery of claim 15, wherein the initiator comprises less than 5 wt % of an initiator-liquid monomer mixture.

20. The structural battery of claim 1, wherein the polymer comprises a resin and a hardener.

* * * * *